(12) United States Patent
Shoji

(10) Patent No.: US 9,771,289 B2
(45) Date of Patent: Sep. 26, 2017

(54) WATER CLEANING SYSTEM, WATER CLEANING METHOD, STARTUP METHOD FOR WATER CLEANING SYSTEM, AND WATER CLEANING UNIT

(71) Applicant: HONMAMONNOUMITSUKUTTARE CO., LTD., Kyoto-shi, Kyoto (JP)

(72) Inventor: Naoyasu Shoji, Fujisawa (JP)

(73) Assignee: HONMAMONNOUMITSUKUTTARE CO., LTD., Kyoto (JP)

( * ) Notice: Subject to any disclaimer, the term of this patent is extended or adjusted under 35 U.S.C. 154(b) by 0 days.

(21) Appl. No.: 14/894,905

(22) PCT Filed: Feb. 4, 2014

(86) PCT No.: PCT/JP2014/052589
§ 371 (c)(1),
(2) Date: Nov. 30, 2015

(87) PCT Pub. No.: WO2014/192330
PCT Pub. Date: Dec. 4, 2014

(65) Prior Publication Data
US 2016/0102004 A1    Apr. 14, 2016

(30) Foreign Application Priority Data

May 30, 2013  (JP) ................ 2013-114062
Feb. 4, 2014    (JP) ................ 2014-019849

(51) Int. Cl.
*C02F 3/30*    (2006.01)
*A01K 63/04*  (2006.01)
(Continued)

(52) U.S. Cl.
CPC ............ *C02F 3/305* (2013.01); *A01K 63/04* (2013.01); *C02F 3/105* (2013.01); *C02F 3/2806* (2013.01);
(Continued)

(58) Field of Classification Search
CPC ...... C02F 3/305; C02F 3/301; C02F 2101/30; C02F 2101/34; C02F 3/2806; C02F 3/105; A01K 63/04; Y02W 10/15
(Continued)

(56) References Cited

U.S. PATENT DOCUMENTS 4,995,980 A    2/1991   Jaubert
4,997,568 A *  3/1991   Vandervelde ........... C02F 3/046
                                                                    210/150
(Continued)

FOREIGN PATENT DOCUMENTS

CN    101665310 A    3/2010
EP    0 328 474 A1    8/1989
(Continued)

OTHER PUBLICATIONS

International Search Report in PCT/JP2014/052589 mailed May 13, 2014.
(Continued)

*Primary Examiner* — Fred Prince
(74) *Attorney, Agent, or Firm* — Studebaker & Brackett PC

(57) ABSTRACT

A water cleaning system 1 includes an aerobic region 90 including breeding water 9 containing organic matter and oxygen, an aerobic layer 6 linking with the aerobic region 90 and inhabited by aerobic bacteria, a facultative anaerobic layer 5 provided adjacent to the aerobic layer 6 and inhabited by facultative anaerobic bacteria, an obligatory anaerobic layer 4 provided adjacent to the facultative anaerobic layer 5, inhabited by obligatory anaerobic bacteria, and made of andosol 40, an anaerobic space 3 having an anaerobic environment, allowing the obligatory anaerobic bacteria inhabiting the obligatory anaerobic layer 4 and products (Continued)

therefrom to flow therein, and a tube 18 as linking means linking the anaerobic space 3 and the aerobic region 90.

15 Claims, 12 Drawing Sheets

(51) Int. Cl.
*C02F 3/28* (2006.01)
*C02F 3/10* (2006.01)
*C02F 3/34* (2006.01)
*C02F 101/30* (2006.01)
*C02F 101/34* (2006.01)

(52) U.S. Cl.
CPC .............. *C02F 3/301* (2013.01); *C02F 3/308* (2013.01); *C02F 3/345* (2013.01); *C02F 2101/30* (2013.01); *C02F 2101/34* (2013.01); *Y02W 10/15* (2015.05)

(58) Field of Classification Search
USPC ....... 210/605, 615, 616, 617, 630, 903, 252, 210/259
See application file for complete search history.

(56) References Cited

U.S. PATENT DOCUMENTS

| 8,721,886 | B2* | 5/2014 | Ahn | ............................ | C02F 1/42 |
| | | | | | 210/170.09 |
| 2003/0047496 | A1 | 3/2003 | Yano | | |
| 2006/0151387 | A1* | 7/2006 | Yost | ........................ | C02F 3/046 |
| | | | | | 210/605 |
| 2007/0267346 | A1* | 11/2007 | Sengupta | .................. | C02F 3/04 |
| | | | | | 210/610 |
| 2011/0100905 | A1 | 5/2011 | Ahn et al. | | |

FOREIGN PATENT DOCUMENTS

| JP | 2665789 | 10/1997 |
| JP | H11-188375 A | 7/1999 |
| JP | 2002-058387 A | 2/2002 |
| JP | 2002-223664 A | 8/2002 |
| JP | 2002-335810 A | 11/2002 |
| WO | 2006/068835 A1 | 6/2006 |

OTHER PUBLICATIONS

The extended European search report issued by the European Patent Office on Jan. 20, 2017, which corresponds to European Patent Application No. 14803548.8-1655 and is related to U.S. Appl. No. 14/894,905.

Notification of First Office Action issued by the State Intellectual Property Office of P.R.China on May 17, 2017, which corresponds to Chinese Patent Application No. 201480031179.5 and is related to U.S. Appl. No. 14/894,905; with English language translation.

\* cited by examiner

WATER CLEANING SYSTEM, WATER CLEANING METHOD, STARTUP METHOD FOR WATER CLEANING SYSTEM, AND WATER CLEANING UNIT

TECHNICAL FIELD

The present invention relates to a water cleaning system, a water cleaning method, a startup method for the water cleaning system, and a water cleaning unit, which require neither a separate device for supplementing a filtering function nor processes of replacing water and sand semipermanently or for a long period of time.

BACKGROUND ART

When hydrosphere organisms are bred in a retention tank such as a water tank, organic matter derived from excrement thereof and the like generates toxic ammonia, nitric acid, and the like. Accordingly, the excrement and the like have been conventionally removed by using a filtration device as well as periodically performing a water replacement process of replacing breeding water in the retention tank with fresh water and a replacement process of replacing sand in the retention tank with new sand. However, an external filtration device of a type provided above the retention tank or the like requires high costs for installation and maintenance management. These costs will increase if the retention tank is large in scale. Furthermore, the processes of replacing water and sand require time and effort and may damage hydrosphere organisms more than a little.

A breeding system not including such an external filtration device mentioned above is typically exemplified by a breeding system of Jaubert's Monaco System disclosed in Patent Document 1. This breeding system includes a water permeable plate member providing a raised bottom, a sand layer provided on the plate member, an aerobic layer provided on the sand layer, having an aerobic environment, and receiving light, and a facultative anaerobic layer provided under the sand layer, having an anaerobic environment, and receiving no light. Aerobic bacteria inhabit the aerobic layer whereas facultative anaerobic bacteria inhabit the facultative anaerobic layer. The aerobic bacteria and the facultative anaerobic bacteria decompose toxic ammonia, nitrous acid, nitric acid, and the like generated from organic matter to exert a filtering function. The breeding system of Jaubert's Monaco System typically does not require the external filtration device mentioned above.

CITATION LIST

Patent Document

PTD 1: Japanese Patent Laying-Open No. 2002-223664

SUMMARY OF INVENTION

Technical Problem

In the above breeding system of Jaubert's Monaco System, however, dead bodies of aerobic bacteria and facultative anaerobic bacteria as well as substances generated by these bacteria accumulate below the plate member or at the bottom of the retention tank. These substances include sulfur compounds containing toxic sulfate ions. If a large amount of the substances accumulate, the substances may pass through the aerobic layer and the facultative anaerobic layer and rush upward to kill hydrosphere organisms. The breeding system of Jaubert's Monaco System thus has an insufficient filtering function and fails to detoxify toxic substances generated from excrement of hydrosphere organisms and the like. It is thus necessary to separately provide a device for supplementing the filtering function or perform the processes of replacing water and sand in order to sufficiently inhibit contamination of breeding water. The breeding system of Jaubert's Monaco System allows a limited number of hydrosphere organisms to be bred therein, and may fail to exert sufficient cleaning ability due to increase in amount of excrement and the like as hydrosphere organisms grow even in a case where the number of hydrosphere organisms is less than or equal to the breedable number, in which case the number of hydrosphere organisms may have to be reduced halfway. Continuous breeding with insufficient cleaning ability will lead to death of all hydrosphere organisms in the retention tank. As described above, notable development in processing excrement and the like has not been made to tools and devices for cleaning water for many years. Such a situation is a great burden to breeders (managers).

Such sulfur compounds are possibly generated in a water tank as well as in a hydrosphere organisms farm provided in the sea or the like due to decomposition of organic matter in water by inhabiting bacteria. Hydrosphere organisms will be damaged if a large amount of sulfur compounds are generated.

The present invention has been made to effectively solve these problems, and an object thereof is to provide a water cleaning system, a water cleaning method, and a startup method for the water cleaning system, which can inhibit accumulation of toxic substances derived from excrement of hydrosphere organisms and the like as well as can require neither a separate device for supplementing a filtering function nor processes of replacing water and sand semipermanently or for a long period of time.

Another object of the present invention is to provide a water cleaning unit that can facilitate the water cleaning system and the water cleaning method in a hydrosphere organisms farm provided in a retention tank such as a water tank, in the sea, or the like.

Solution to Problem

The present invention provides the following means in order to achieve these objects.

A water cleaning system according to the present invention includes: an aerobic region including organic matter and oxygen; an aerobic layer linking with the aerobic region and inhabited by aerobic bacteria; a facultative anaerobic layer provided adjacent to the aerobic layer and inhabited by facultative anaerobic bacteria; an obligatory anaerobic layer provided adjacent to the facultative anaerobic layer, inhabited by obligatory anaerobic bacteria, and made of a soil material; an anaerobic space having an anaerobic environment, allowing the obligatory anaerobic bacteria inhabiting the obligatory anaerobic layer and products therefrom to flow therein; and linking means linking the anaerobic space and the aerobic region.

The soil material has only to have a property, a function, and the like similar to those of naturally existing soil, such as leaf mold. The soil material is not limited to the naturally existing soil but can be produced artificially. The soil material having a property, a function, and the like similar to those of soil allows inhabitation of obligatory anaerobic bacteria similarly to soil. Furthermore, when the soil material forms a layer, organic matter, microorganisms, and the like are movable in the layer and an anaerobic environment can be provided in the layer. The soil material is not particularly limited in shape thereof insofar as the soil material achieves the property, the function, and the like. The soil material can be formed into a layer by pressing, for example, soil and other particulate substances, or can have a massive shape like sponge, so as to configure a layer by itself. A state where the aerobic region and the aerobic layer link with each other indicates a state where organic matter, oxygen, water, and the like, if any in the aerobic region, are movable to the aerobic layer. A state where the anaerobic space and the aerobic region link with each other indicates a state where obligatory anaerobic bacteria, hydrogen sulfide, water, and the like, if any in the anaerobic space, are movable to the aerobic region.

In such a configuration, organic matter in the aerobic region reaches the aerobic layer and subsequently reaches the facultative anaerobic layer, and is decomposed by aerobic bacteria and facultative anaerobic bacteria inhabiting the aerobic layer and the facultative anaerobic layer, respectively. Decomposed matter thus obtained then reaches the obligatory anaerobic layer and is decomposed by obligatory anaerobic bacteria. Sulfur compounds are decomposed into hydrogen sulfide by sulfate-reducing bacteria that are obligatory anaerobic bacteria and are inhabitable only under an anaerobic condition. Hydrogen sulfide thus generated is reduced in toxicity in at least one of the aerobic region, the aerobic layer, the facultative anaerobic layer, the obligatory anaerobic layer, and the anaerobic space. Reduction in toxicity means reducing toxicity to hydrosphere organisms. Specifically, hydrogen sulfide is reduced in toxicity by reacting with an iron component in water while moving, along with sulfate-reducing bacteria, to the aerobic region through the linking means into iron sulfide less toxic to hydrosphere organisms than hydrogen sulfide, or by being converted to different sulfur compounds less toxic to hydrosphere organisms than hydrogen sulfide by sulfur oxidizing bacteria, photosynthetic bacteria, and the like inhabiting the aerobic layer and the like. The sulfate-reducing bacteria having moved to the aerobic region can inhabit even an aerobic environment by reacting with iron sulfide. The sulfate-reducing bacteria reach a surface of the aerobic layer and decompose organic matter if the organic matter therein is relatively large in amount but come into a dormant state if the organic matter therein is relatively small in amount so as to increase in amount of organic matter to be decomposed. Decomposition of organic matter in water as well as reduction in toxicity of hydrogen sulfide generated through the decomposition as described above can inhibit accumulation of toxic matter derived from the organic matter neither with a separate device for supplementing a filtering function nor with processes of replacing water and sand semipermanently or for a long period of time, and can clean water in the retention tank such as a water tank or water in a hydrosphere organisms farm provided in the sea or the like. In a case where the water cleaning system according to the present invention is applied to breeding of hydrosphere organisms, there is no need to reduce the number of bred hydrosphere organisms even after hydrosphere organisms have grown but the number of breedable hydrosphere organisms can be increased in comparison to a conventional case.

In order to facilitate formation of the anaerobic space and stably keep the anaerobic space for a long period of time, preferably, an opening at a top of a hollow member is closed by a meshed member having water permeability and blocking passage of the soil material, the soil material surrounds the hollow member and the meshed member to form the anaerobic space in the hollow member.

In order to multiply obligatory anaerobic bacteria easily and reliably as well as form the obligatory anaerobic layer that can decompose a sufficient amount of organic matter, the soil material is preferably andosol.

In order to keep water containing organic matter slightly alkaline like seawater to keep an environment appropriate for breeding saltwater fishes and inhibit reduction in activity of sulfate-reducing bacteria, the aerobic layer is preferably provided, on a surface thereof, with a layer made of coral sand.

According to another method of easily forming the anaerobic space, preferably, the retention tank includes a nontransmissive portion blocking transmission of light from a lower portion in a side surface and from a bottom surface, a meshed member having water permeability and blocking passage of the soil material is entirely provided at a lower portion in the retention tank so as to be apart from an inner bottom surface of the retention tank, the meshed member has an upper surface covered with the soil material and the anaerobic space is formed between the meshed member and the inner bottom surface.

A water cleaning method according to the present invention includes: installing, in water, a first bacteria inhabitable portion made of a soil material that is inhabitable by obligatory anaerobic bacteria and preliminarily pressed into a massive shape, forming, in water, a second bacteria inhabitable portion that is adjacent to the first bacteria inhabitable portion, has a particulate carrier, and is inhabitable by facultative anaerobic bacteria, a third bacteria inhabitable portion that is adjacent to the second bacteria inhabitable portion, has a particulate carrier, and is inhabitable by aerobic bacteria, and an anaerobic space that has an anaerobic environment and links with the first bacteria inhabitable portion, locating, at a position linking with the third bacteria inhabitable portion, an aerobic region including organic matter and oxygen, and linking the aerobic region and the anaerobic space, and forming an obligatory anaerobic layer by multiplying obligatory anaerobic bacteria in the first bacteria inhabitable portion, forming a facultative anaerobic layer by multiplying facultative anaerobic bacteria in the second bacteria inhabitable portion, forming an aerobic layer by multiplying aerobic bacteria in the third bacteria inhabitable portion, causing these bacteria to decompose the organic matter in the aerobic region, and moving the obligatory anaerobic bacteria flowing out of the obligatory anaerobic layer and products therefrom from the anaerobic space to the aerobic region.

A state where the first bacteria inhabitable portion and the anaerobic space link with each other indicates a state where obligatory anaerobic bacteria, products therefrom, water, and the like, if any in the first bacteria inhabitable portion, are movable to the anaerobic space. A state where the aerobic space and the third bacteria inhabitable portion link with each other indicates a state where organic matter, oxygen, water, and the like, if any in the aerobic space, are movable to the third bacteria inhabitable portion. A state where the anaerobic space and the aerobic region link with each other indicates a state where obligatory anaerobic bacteria, hydrogen sulfide, water, and the like, if any in the anaerobic space, are movable to the aerobic region.

In accordance with such a method, the aerobic region including organic matter is located at a position linking with the third bacteria inhabitable portion and the aerobic region and the anaerobic space are brought into the linking state. Accordingly, obligatory anaerobic bacteria multiply in the first bacteria inhabitable portion to form the obligatory anaerobic layer, facultative anaerobic bacteria multiply in the second bacteria inhabitable portion to form the facultative anaerobic layer, and aerobic bacteria multiply in the third bacteria inhabitable portion to form the aerobic layer. Similarly to the water cleaning system according to the present invention, decomposition of organic matter in water as well as reduction in toxicity of hydrogen sulfide generated through the decomposition can thus inhibit accumulation of toxic matter derived from the organic matter neither with a separate device for supplementing a filtering function nor with processes of replacing water and sand semipermanently or for a long period of time. In a case where the water cleaning method according to the present invention is applied to breeding of hydrosphere organisms, there is no need to reduce the number of bred hydrosphere organisms even after hydrosphere organisms have grown but the number of breedable hydrosphere organisms can be increased in comparison to a conventional case. Furthermore, provision of the first bacteria inhabitable portion preliminarily pressed into a massive shape enables artificial formation of a decomposition cycle of organic matter for causing the reduction in toxicity of hydrogen sulfide at a desired position in a short period of time.

In order to start up the water cleaning system, it is preferred to, using a cylindrical member as the linking means, apply light to the aerobic layer in a state where the aerobic region includes organic matter, and simultaneously supply gas from gas supply means into the cylindrical member to generate a stream from the anaerobic space toward above the aerobic layer in the cylindrical member, and keep the state for a predetermined period of time.

A water cleaning unit according to the present invention is used to construct the water cleaning system. An exemplary water cleaning unit includes: a bacteria inhabitable portion in a massive shape, made of a soil material and inhabitable by obligatory anaerobic bacteria; and a cylindrical member that has a first open portion and a second open portion, has a length to extend from a first end to a second end of the bacteria inhabitable portion, wherein the second open portion is positioned apart from the bacteria inhabitable portion by a predetermined distance at the second end of the bacteria inhabitable portion when the first open portion is positioned to face the first end of the bacteria inhabitable portion.

In such a configuration, the water cleaning unit is immersed in water containing organic matter and the particulate carrier or the like is supplied to form the aerobic layer and the facultative anaerobic layer on a surface provided with a second end of the cylindrical member in the bacteria inhabitable portion, so that the bacteria inhabitable portion can be provided, at the first end thereof, with a closed space using closed space forming means or the like. The second open portion is positioned apart from the bacteria inhabitable portion by the predetermined distance when the cylindrical member is positioned to face the first open portion at the first end of the bacteria inhabitable portion. The anaerobic space linking with the aerobic region, the aerobic layer, the facultative anaerobic layer, the obligatory anaerobic layer, and the aerobic region can be easily formed with the second end of the cylindrical member not closed by the particulate carrier or the like. The bacteria inhabitable portion is formed into a massive shape by preliminarily pressing the soil material, so as to easily form the obligatory anaerobic layer in water as well as shorten a startup period of time necessary for establishing the decomposition cycle of organic matter.

In order to form the anaerobic space more easily, preferably, the water cleaning unit further includes: a closed space surrounded with closing means that is at least partially formed by the bacteria inhabitable portion; wherein the cylindrical member has a length to extend from the closed space through the closing means, and the second open portion is positioned apart from the bacteria inhabitable portion by a predetermined distance when the first open portion is positioned to face the closed space.

In order to inhibit the bacteria inhabitable portion from crumbling due to loosening of the soil material and inhibit the soil material from flowing out of the water cleaning unit immersed in water, preferably, at least a surface, not provided with the cylindrical member projecting therefrom, of the bacteria inhabitable portion is covered with a surrounding member blocking passage of the soil material.

In order to prevent light from entering the closed space without use of any other member upon configuring the water cleaning system including an ordinary transparent water tank, the surrounding member preferably has a light shielding property.

In order to inhibit the soil material from entering the closed space, the bacteria inhabitable portion and the closed space are preferably provided therebetween with a meshed member having water permeability and blocking passage of the soil material.

For construction of the water cleaning system including the water cleaning unit described above, the particulate carrier occasionally needs to be supplied to form the facultative anaerobic layer and the aerobic layer. In order to provide the water cleaning unit that does not require time and effort therefor, preferably, the water cleaning unit further includes a particulate carrier inhabitable by aerobic bacteria and facultative anaerobic bacteria to form, when the bacteria inhabitable portion inhabitable by obligatory anaerobic bacteria is defined as a first bacteria inhabitable portion, a second bacteria inhabitable portion that is adjacent to the first bacteria inhabitable portion and is inhabitable by facultative anaerobic bacteria and a third bacteria inhabitable portion that is adjacent to the second bacteria inhabitable portion and is inhabitable by aerobic bacteria.

In order to achieve reduction in weight of the water cleaning unit, the bacteria inhabitable portion is preferably dry.

In order to achieve use of a plurality of stacked water cleaning units or facilitate installation also at an uneven place such as the bottom of the sea, preferably, the water cleaning unit further includes a support leg for securing a predetermined gap from an installation surface.

Advantageous Effects of Invention

The present invention described above can provide a water cleaning system, a water cleaning method, a startup method for the water cleaning system, and a water cleaning unit, which inhibit accumulation of toxic matter derived from organic matter and reduce toxicity of hydrogen sulfide generated from organic matter due to action of bacteria by converting into a less toxic substance or the like, so as to be useful neither with a device for supplementing a filtering function nor with processes of replacing water and sand semipermanently or for a long period of time.

DESCRIPTION OF EMBODIMENTS

<First Embodiment>

The first embodiment according to the present invention will now be described below with reference to FIGS. 1 to 7.

Figure 1:
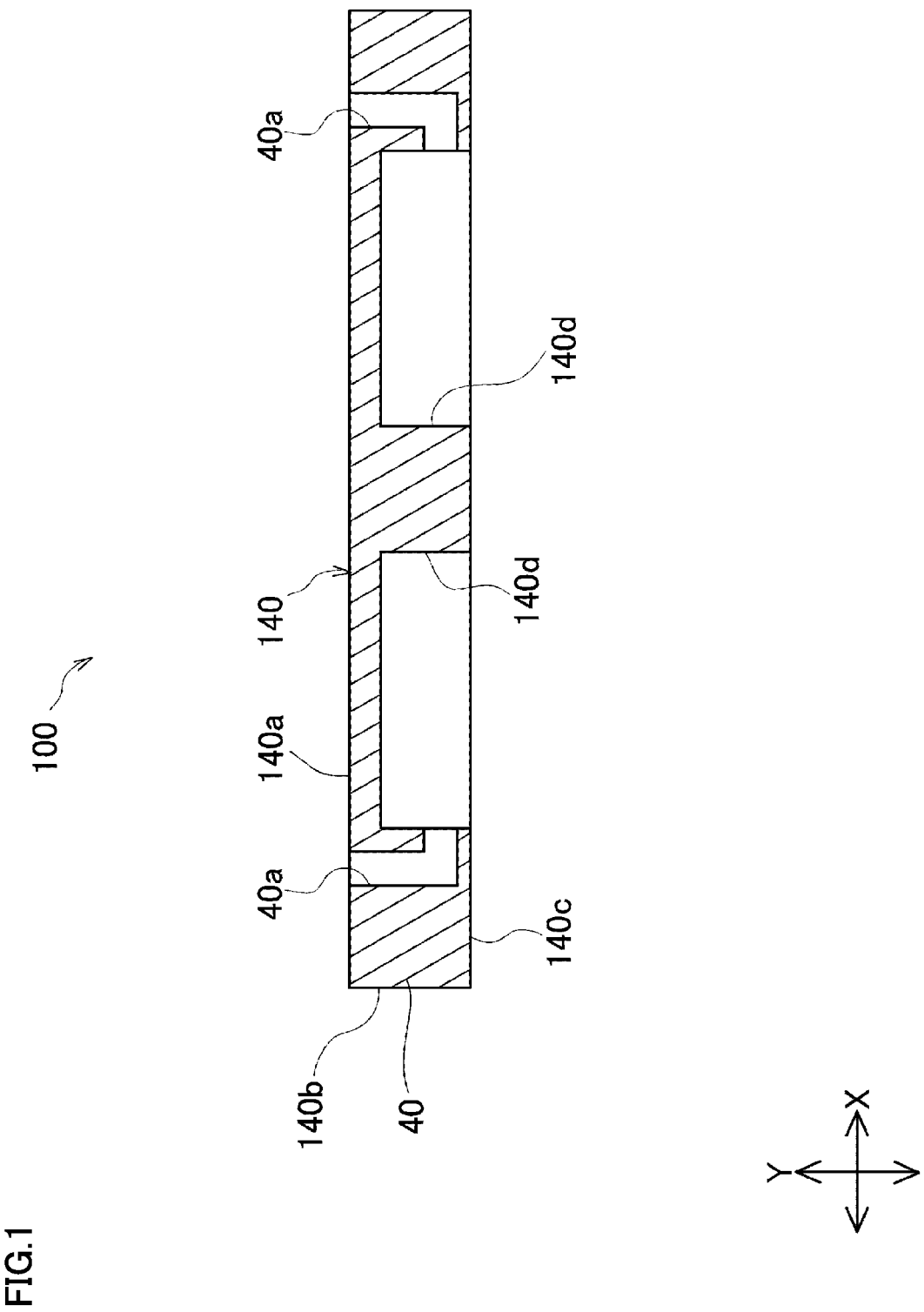
FIG. 1 is a sectional view of a water cleaning unit according to a first embodiment of the present invention.

As depicted in FIG. 1, a water cleaning unit 100 according to the first embodiment of the present invention is used as a breeding unit for hydrosphere organisms, and includes a bacteria inhabitable portion 140 having a massive shape and inhabitable by obligatory anaerobic bacteria. Bacteria inhabitable portion 140 is provided with a cylindrical member insertion hole 40a serving as a penetrating portion penetrating from a first end to a second end of bacteria inhabitable portion 140.

Figure 2:
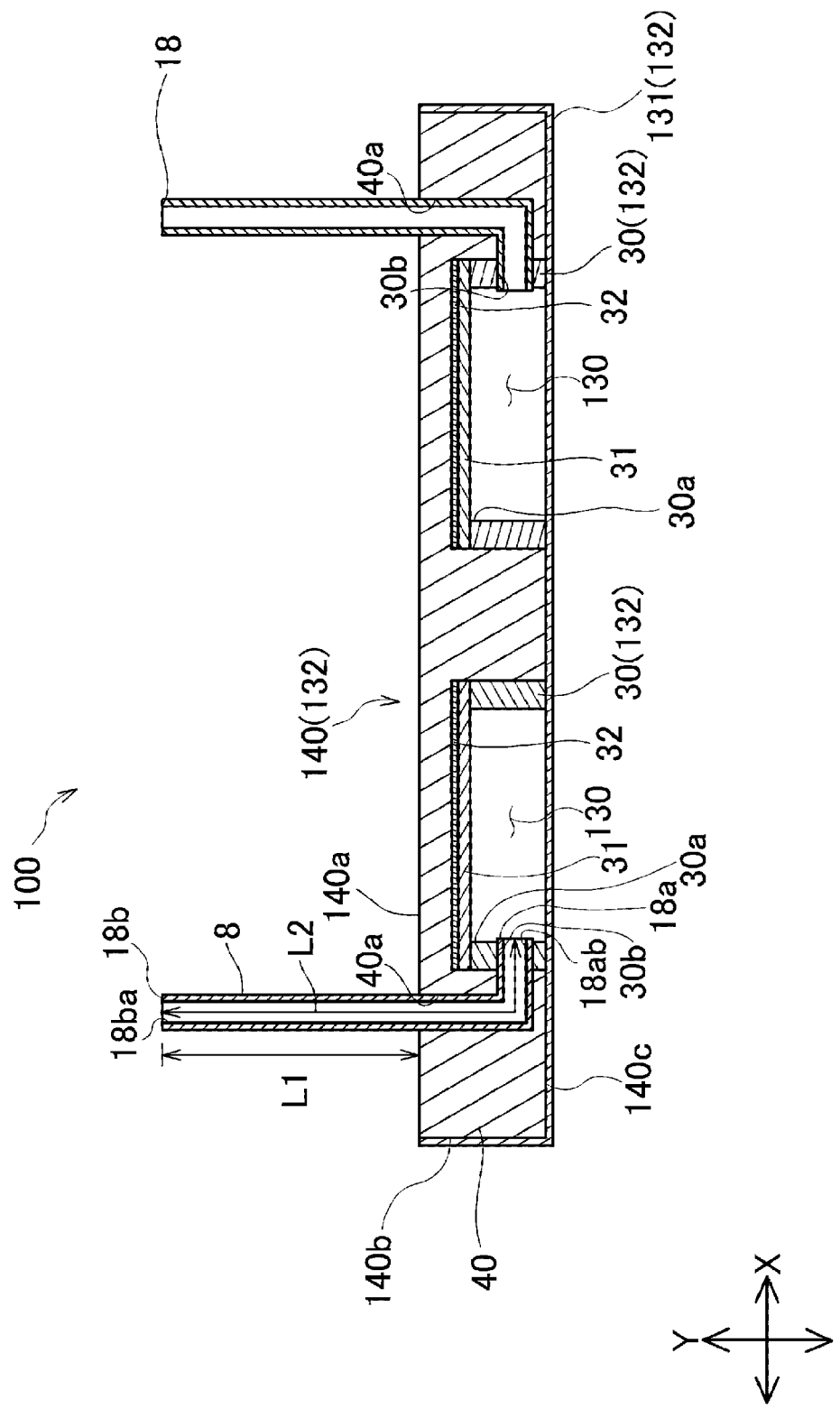
FIG. 2 is a sectional view of a state where a cylindrical member and the like are attached to the cleaning unit.

Bacteria inhabitable portion 140 is dry and is formed by pressing andosol 40 serving as a soil material having an aggregate structure into a substantially rectangular shape in a plan view. Such a dry state includes a state of containing no moisture as well as a state of containing some moisture. Bacteria inhabitable portion 140 has a recess provided therein with a hollow member 30 having an opening 30b depicted in FIG. 2. Cylindrical member insertion hole 40a is provided therein with a tube 18. Furthermore, bacteria inhabitable portion 140 has its periphery surrounded with a surrounding member 131. There is thus provided a closed space 130 at least partially surrounded with bacteria inhabitable portion 140, with tube 18 extending from closed space 130. Hollow member 30 surrounds both ends (lateral portions) in a first direction X (the horizontal direction in the present embodiment) of closed space 130. Surrounding member 131 surrounds a first end (the bottom in the present embodiment) in a second direction Y (the vertical direction in the present embodiment), which is perpendicular to first direction X, of closed space 130 Furthermore, bacteria inhabitable portion 140 surrounds a second end (the top in the present embodiment) in second direction Y of closed space 130. Hollow member 30 has a cylindrical shape with both ends in second direction Y being open. There are provided two hollow members 30 so as to be apart from each other. Hollow members 30 each have an upper opening 30a mounted with a latticed or slotted plate member 31 having a surface covered with a meshed member 32. The periphery except for a first end in second direction Y of hollow member 30 is covered with andosol 40 configuring bacteria inhabitable portion 140. Meshed member 32 blocks passage of andosol 40 and has water permeability, so as to inhibit andosol 40 in bacteria inhabitable portion 140 from entering closed space 130 from above. Meshed member 32 can be exemplified by a meshed cloth, a fibrous sheet, or the like having such functions. Surrounding member 131 has a light shielding property and a sheet or plate shape to block passage of andosol 40 and oxygen. As depicted in FIG. 2, surrounding member 131 covers both surfaces 140b in first direction X, a first surface 140c in second direction Y of bacteria inhabitable portion 140, and the first end in second direction Y of hollow member 30. Surrounding member 131, hollow member 30, and bacteria inhabitable portion 140 configure closing means 132 surrounding closed space 130. Hollow member 30 is not limited in shape to the cylindrical shape, but can have a box shape with only a second end in second direction Y being open. In this case, hollow member 30 and bacteria inhabitable portion 140 configure closing means 132. The number of the closed spaces 130 is not limited to two, but can be one, or greater than or equal to three.

Tube 18 serving as linking means (cylindrical member) is provided with a first open portion 18ab and a second open portion 18ba that are apart from each other by a second distance L2 in an extending direction. Open portions 18ab and 18ba are provided at respective ends of tube 18 according to the present embodiment. Open portions 18ab and 18ba are not particularly limited insofar as open portions 18ab and 18ba are positioned to link an anaerobic space 3 with an aerobic region 90 in a water cleaning system 1 to be described later (see FIG. 4). Open portions 18ab and 18ba can be provided not at the ends but at the center in the extending direction of tube 18. Tube 18 extends from closed space 130 provided with a first end 18a in first direction X through hollow member 30, bends at a right angle inside bacteria inhabitable portion 140, and has a second end 18b that serves as an extending end projecting from a second surface 140a in second direction Y of bacteria inhabitable portion 140. First open portion 18ab is positioned to face closed space 130 whereas second open portion 18ba is positioned apart from bacteria inhabitable portion 140 by a first distance L1. The linking means can be embodied not only by tube 18 but also by a cylindrical member such as a pipe to be described later. Tube 18 and the pipe are not particularly limited in terms of their materials, but can be made of vinyl chloride, ceramic, iron, glass, or rubber. When the linking means is made of vinyl chloride or ceramic, corrosion of the linking means can be inhibited for a long period of time even in a case where seawater is used as breeding water to be described later. The linking means preferably has a radius appropriate for capacity of a retention tank to be described later, or the like. Tube 18 extends from each closed space 130 in the present embodiment. Each closed space 130 can alternatively be provided with a plurality of tubes 18. Tube 18, hollow member 30, meshed member 32, plate member 31, and surrounding member 131 are attached to bacteria inhabitable portion 140 in water cleaning unit 100 as described above. Alternatively, at least one of these members can be preliminarily fixed to bacteria inhabitable portion 140.

Figure 3:
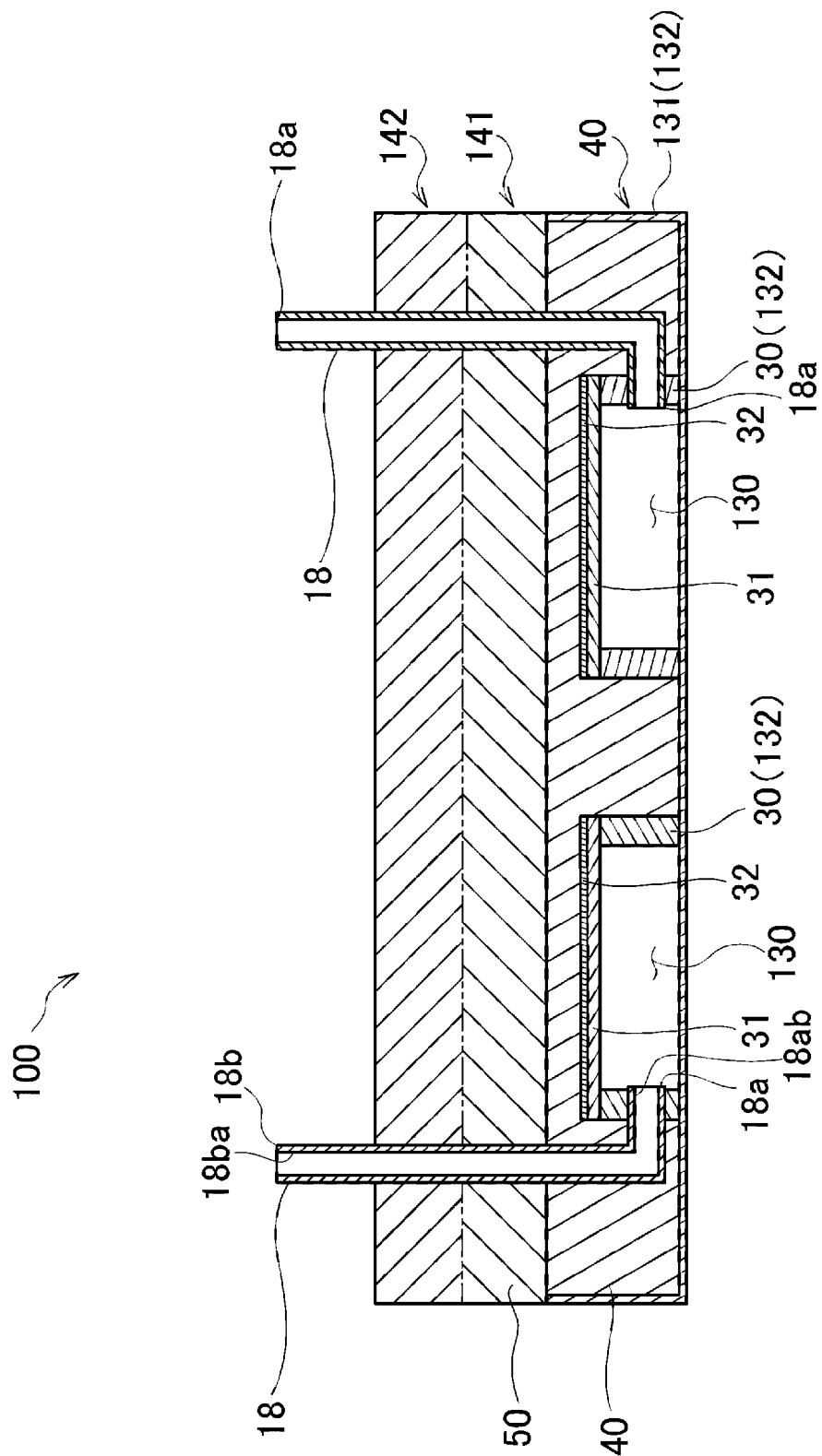
FIG. 3 is a sectional view of a state where a second bacteria inhabitable portion and a third bacteria inhabitable portion are further attached to the cleaning unit.

In a case where bacteria inhabitable portion 140 is defined as a first bacteria inhabitable portion 140 as depicted in FIG. 3, a second bacteria inhabitable portion 141 inhabitable by facultative anaerobic bacteria is attached so as to be adjacent to a second end in second direction Y of first bacteria inhabitable portion 140 and a third bacteria inhabitable portion 142 inhabitable by aerobic bacteria is attached so as to be adjacent to a second end in second direction Y of second bacteria inhabitable portion 141. Second bacteria inhabitable portion 141 and third bacteria inhabitable portion 142 are formed by pressing to a certain degree a particulate carrier such as sand 50 into a substantially rectangular shape in a plan view. Surrounding member 131 is not provided on side surfaces of second bacteria inhabitable portion 141 and third bacteria inhabitable portion 142 in the present embodiment. Alternatively, the side surfaces of bacteria inhabitable portions 141 and 142 can be surrounded with surrounding member 131. Second bacteria inhabitable portion 141 and third bacteria inhabitable portion 142 can be preliminarily provided so as to be adjacent to first bacteria inhabitable portion 140 or can be preliminarily provided to a different water cleaning unit to be described later.

Figure 4:
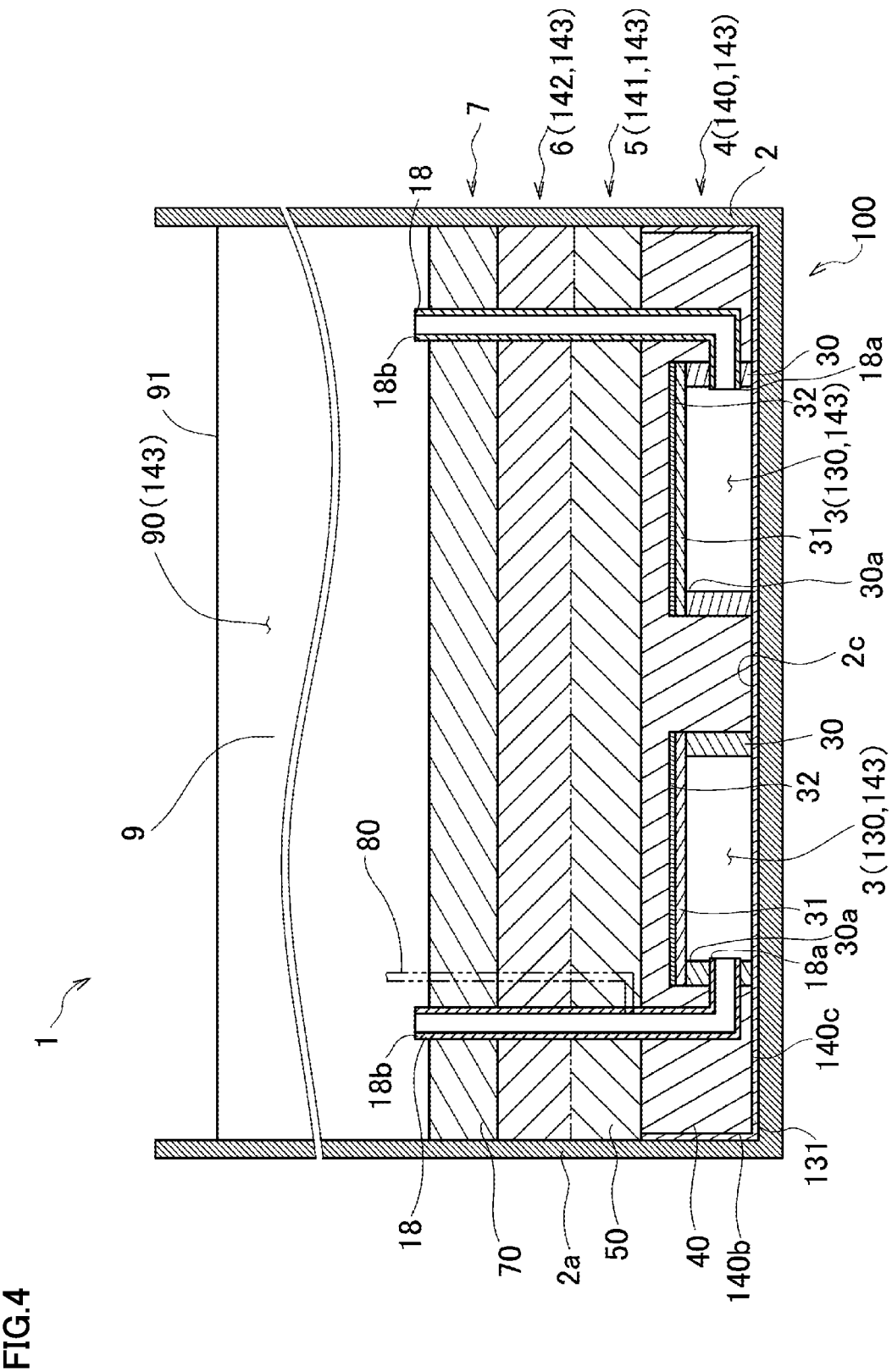
FIG. 4 is a sectional view of a water cleaning system according to the first embodiment provided with the cleaning unit.
Figure 5:
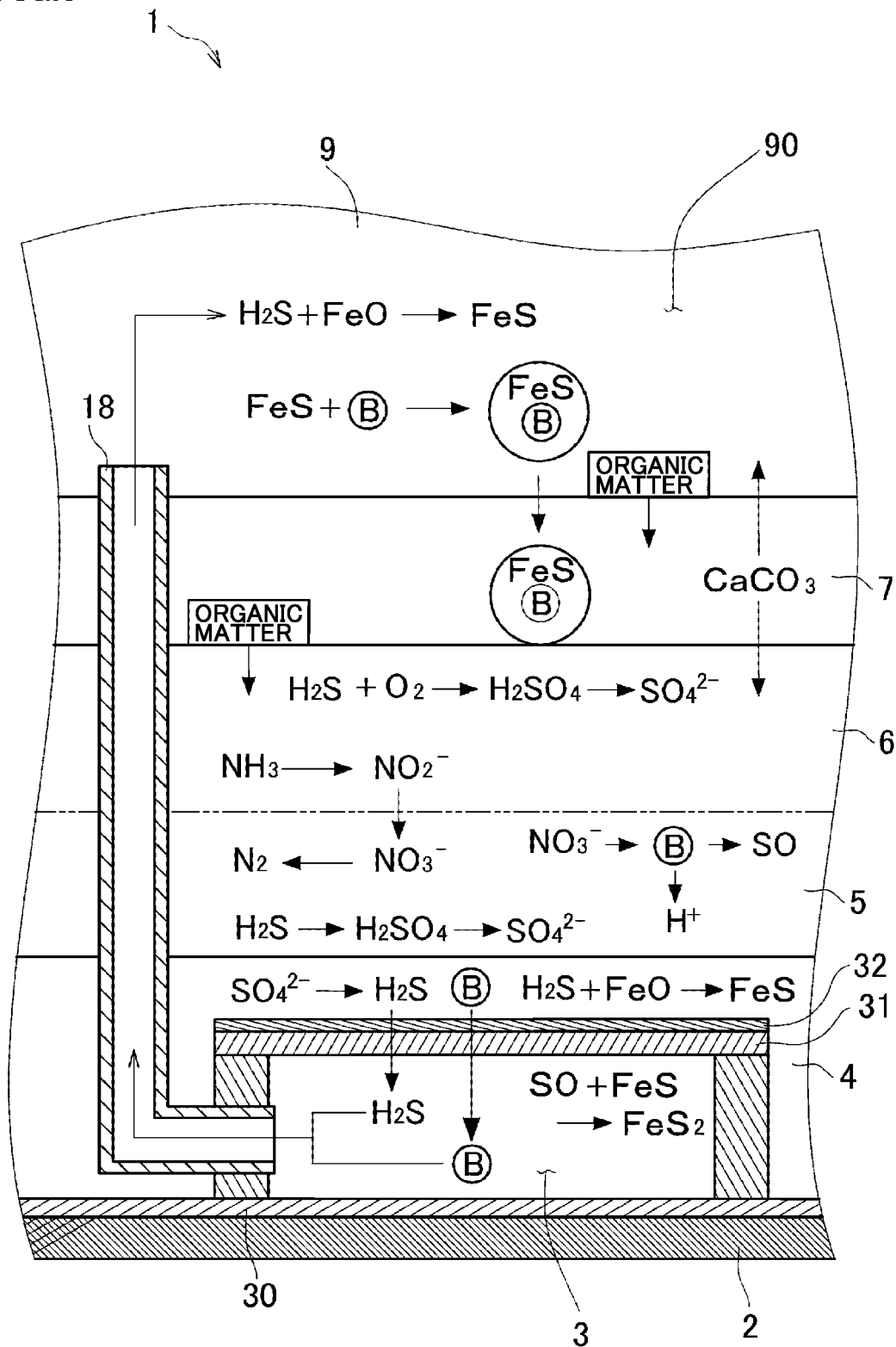
FIG. 5 is a pattern view of circulation of organic matter in the cleaning system.

In order to configure water cleaning system 1 according to the first embodiment of the present invention so as to include water cleaning unit 100, water cleaning unit 100 is mounted on an inner bottom surface 2c of a retention tank (water tank) 2 made of transparent glass or acryl as depicted in FIG. 4, coral sand 70 is then supplied on a surface thereof (on third bacteria inhabitable portion 142) to form aerobic region 90 inhabitable by hydrosphere organisms (aquatic organisms) above a coral layer 7. In this case, coral sand 70 is accumulated only to a position lower than second end 18b of tube 18 so that second end 18b of tube 18 projects from coral layer 7 made of coral sand 70. Coral sand 70 contains calcium carbonate ($CaCO_3$) as a component thereof. When calcium carbonate elutes into breeding water 9 as depicted in FIG. 5, breeding water 9 is adjusted to be alkaline. Coral sand 70 can have diameters of about 1 to 30 mm, and can be natural or artificial. In order to increase in amount of hydrogen sulfide that is to be reduced in toxicity in a hydrogen sulfide toxicity reducing region to be described later, water cleaning unit 100 can include bacteria inhabitable portion 140 additionally provided with an iron component such as powdered iron, or sand 50 and the like can be mixed with an iron component. Subsequently, retention tank 2 is filled with breeding water 9 as depicted in FIG. 4, and water cleaning unit 100 and coral sand 70 are immersed in breeding water 9. Saltwater fishes are bred as hydrosphere organisms in the present embodiment, and natural seawater or artificial seawater is used as slightly alkaline breeding water 9. Opening 30a of hollow member 30 is closed by meshed member 32 with plate member 31 being interposed therebetween. Accordingly, andosol 40 will not enter hollow member 30 and hollow member 30 is filled with breeding water 9. First bacteria inhabitable portion 140 formed by preliminarily pressing andosol 40 into a massive shape is thus installed in breeding water 9. Sand 50 is used as a particulate carrier in the present embodiment. The particulate carrier can be made of an artificial material such as plastic or can be wood chips, gravel, or the like insofar as the particulate carrier is inhabitable by aerobic bacteria and facultative anaerobic bacteria. Timing for filling retention tank 2 with breeding water 9 is not limited to after supply of coral sand 70, but can be before mounting water cleaning unit 100, or after mounting water cleaning unit 100 and before supply of coral sand 70.

In a case where water cleaning unit 100 includes neither second bacteria inhabitable portion 141 nor third bacteria inhabitable portion 142 preliminarily pressed to a certain degree, water cleaning unit 100 is mounted on inner bottom surface 2c of retention tank 2. Thereafter, sand 50 (or gravel) and coral sand 70 are sequentially supplied on the surface thereof and retention tank 2 is filled with breeding water 9 (breeding water 9 can be filled before water cleaning unit 100 is mounted, or after water cleaning unit 100 is mounted and before sand 50 or coral sand 70 is supplied), so that second bacteria inhabitable portion 141 inhabitable by facultative anaerobic bacteria is formed below the layer of sand 50 adjacent to first bacteria inhabitable portion 140 and third bacteria inhabitable portion 142 inhabitable by aerobic bacteria is formed thereabove. An exemplary amount of sand 50 to be used is about one sixth to one eighth of the volume of breeding water 9. Sand 50 can be collected at the bottom of the sea or the like originally inhabited by aerobic bacteria and facultative anaerobic bacteria. In this case, these bacteria are likely to be settled in an aerobic layer 6 and a facultative anaerobic layer 5 during startup of water cleaning system 1 to be described later with a shorter period of time required for the startup.

The linking means (tube 18) is provided to project upward from closed space 130 in the present embodiment. Alternatively, the linking means can be provided to project downward, or can be provided to extend laterally from closed space 130 and project from side surface 140b of first bacteria inhabitable portion 140. In a case where sand 50 and the like are sequentially supplied to form second bacteria inhabitable portion 141 and third bacteria inhabitable portion 142 in such a configuration, a surrounding member covering side surfaces 140b, lower surface 140c, and the like of first bacteria inhabitable portion 140 preferably has the upper end positioned above upper surface 140a of first bacteria inhabitable portion 140 so as to prevent sand 50 and the like from closing the second end of the tube. Sand 50 and the like are accumulated in this surrounding member. Such a surrounding member can be provided to indicate what amount of sand 50 and the like should be supplied. Instead of providing such a surrounding member, the tube or the pipe can be made longer such that the second end is sufficiently apart from side surface 140b of first bacteria inhabitable portion 140.

After breeding water 9 is filled, hydrosphere organisms are bred in aerobic region 90 located at a second end in second direction Y of coral sand 70 to cause breeding water 9 to contain a certain amount of organic matter derived from hydrosphere organisms. When such a state is kept for a certain period of time, third bacteria inhabitable portion 142, which receives light from above and from the lateral sides and has an aerobic environment with entry of oxygen dissolved in breeding water 9, configures aerobic layer 6 to multiply a plurality of types of aerobic bacteria inhabitable under an aerobic condition. Examples of the organic matter derived from hydrosphere organisms include excrement and dead bodies of hydrosphere organisms. Examples of aerobic bacteria include sulfur oxidizing bacteria such as photosynthetic sulfur bacteria, photosynthetic bacteria, and nitrifying bacteria. Aerobic bacteria inhabiting aerobic layer 6 consume oxygen in breeding water 9 and the amount of oxygen gradually decreases toward the bottom in the layer of sand 50, so that second bacteria inhabitable portion 141 has an anaerobic environment with no or little oxygen and facultative anaerobic layer 5 is generated. Facultative anaerobic layer 5 receives little light due to blockage by aerobic layer 6, so that a plurality of types of facultative anaerobic bacteria, which are habitable under an aerobic condition as well as under an anaerobic environment, multiply. Examples of facultative anaerobic bacteria include sulfur oxidizing bacteria such as colorless sulfur bacteria, and nitrate-reducing bacteria.

First bacteria inhabitable portion 140 having a flat surface is provided with second bacteria inhabitable portion 141 and third bacteria inhabitable portion 142 at the second end in second direction Y, and light from the lateral sides and from below is blocked by andosol 40. First bacteria inhabitable portion 140 thus has an anaerobic environment with no light received and no oxygen contained, and an obligatory anaerobic layer 4 is generated. Accordingly, a plurality of types of obligatory anaerobic bacteria, which are inhabitable under an anaerobic condition, multiply. Examples of obligatory anaerobic bacteria include a plurality of types of sulfate-reducing bacteria B (see FIG. 5) that can inhabit obligatory anaerobic layer 4 as well as facultative anaerobic layer 5 and act differently. Sulfate-reducing bacteria B are most activated under a slightly alkaline environment. The number of inhabiting obligatory anaerobic bacteria in a surface portion of obligatory anaerobic layer 4 in contact with retention tank 2 (a portion blocking light transmitted through retention tank 2) is relatively smaller than that of the interior of obligatory anaerobic layer 4. First bacteria inhabitable portion 140 is made of andosol 40 that is originally inhabited by sulfate-reducing bacteria B. Sulfate-reducing bacteria B can multiply in first bacteria inhabitable portion 140 in a relatively short period of time to form obligatory anaerobic layer 4. Closed space 130 configures anaerobic space 3 having an anaerobic environment with no light received and no oxygen contained. Tube 18 directly links anaerobic space 3 and aerobic region 90. Aerobic bacteria, facultative anaerobic bacteria, and obligatory anaerobic bacteria sequentially multiply in this manner to generate chained circulation of microorganisms. Water cleaning system 1 is thus formed as a breeding system for hydrosphere organisms in the present embodiment. Retention tank 2 is preferably provided thereabove with a water tank air pump (not depicted) for supplying breeding water 9 with oxygen. Anaerobic space 3 is preferably made larger as retention tank 2 has larger capacity. The amount of andosol 40 configuring obligatory anaerobic layer 4 is preferably about one sixth to one eighth of the volume of breeding water 9, for example.

In water cleaning system 1 thus configured, aerobic region 90 including organic matter derived from hydrosphere organisms and oxygen is positioned to link with third bacteria inhabitable portion 142 via coral layer 7. When the organic matter derived from hydrosphere organisms bred in breeding water 9 passes through coral layer 7 and is deposited on the surface of aerobic layer 6, the organic matter is decomposed by aerobic bacteria in aerobic layer 6 and is then decomposed by facultative anaerobic bacteria in facultative anaerobic layer 5 provided below aerobic layer 6. As described above, the plurality of types of aerobic bacteria and facultative anaerobic bacteria inhabit layers 5 and 6, respectively. Among these, nitrifying bacteria serving as aerobic bacteria and nitrate-reducing bacteria serving as facultative anaerobic bacteria, for example, decompose toxic ammonia ($NH_3$) initially into nitrite ions ($NO_2^-$) and nitrate ions ($NO_3^-$) and then into innocuous nitrogen ($N_2$), as depicted in FIG. 5. This is reaction called heterotropic denitrification or simply called denitrification. Facultative anaerobic layer 5 intakes nitrate ions that are generated by part of sulfate-reducing bacteria B having moved from obligatory anaerobic layer 4 in the process of heterotropic denitrification, and sulfate-reducing bacteria B emit elemental sulfur (SO) and hydrogen ions ($H^+$). This is called autotropic denitrification or sulfur denitrification. In a case where breeding water 9 is neutralized or acidified by the hydrogen ions, sulfate-reducing bacteria B may be deteriorated in action or damage hydrosphere organisms that prefer a slightly alkaline environment. However, hydrogen ions are neutralized by calcium carbonate eluted from coral sand 70. At an initial stage after the start of water cleaning system 1, ammonia is decomposed mainly into nitrogen by heterotropic denitrification. However, autotropic denitrification gradually becomes dominant, and ammonia will be decomposed mainly by autotropic denitrification after elapse of several years from the start of water cleaning system 1. Furthermore, phosphoric acid and the like, which have been removed using a conventionally known filtration device or through processes of replacing water and sand, are decomposed by different types of aerobic bacteria and facultative anaerobic bacteria.

Decomposed matter and the like by these aerobic bacteria and facultative anaerobic bacteria infiltrate obligatory anaerobic layer 4 due to the effect of negatively-charged colloidal particles in andosol 40, and are decomposed by obligatory anaerobic bacteria in obligatory anaerobic layer 4. A plurality of obligatory anaerobic bacteria inhabit obligatory anaerobic layer 4 as described above, and part of sulfate-reducing bacteria B generate hydrogen sulfide ($H_2S$) from sulfur compounds containing sulfate ions ($SO_4^{2-}$) as depicted in FIG. 5. Obligatory anaerobic layer 4 links with anaerobic space 3 via meshed member 32 and plate member 31. Part of hydrogen sulfide thus generated and sulfate-reducing bacteria B move from obligatory anaerobic layer 4 to anaerobic space 3 through meshed member 32 and plate member 31. In obligatory anaerobic layer 4, part of hydrogen sulfide reacts with iron oxide (FeO) to generate iron sulfide (FeS) that is less toxic. Such reaction occurs also in anaerobic space 3 and aerobic region 90. In anaerobic space 3, elemental sulfur generated by autotropic denitrification reacts with iron sulfide to generate iron disulfide ($FeS_2$) as depicted in FIG. 5. Iron disulfide is gradually solidified, so that a substance containing iron disulfide as a component and called iron pyrites or pyrite is accumulated in anaerobic space 3 for tens of years. Such reaction occurs also in obligatory anaerobic layer 4. Colorless sulfur bacteria generate sulfuric acid ($H_2SO_4$) from hydrogen sulfide in facultative anaerobic layer 5 as depicted in FIG. 5, so that hydrogen sulfide is reduced in toxicity also in this manner. Such reaction occurs also in obligatory anaerobic layer 4. Andosol 40 originally contains an iron component. Hydrogen sulfide also reacts with this iron component to generate iron sulfide. In a case where facultative anaerobic layer 5, aerobic layer 6, and the like further contain an iron component or a different metal component, such a component may absorb or reduce in toxicity toxic substances such as hydrogen sulfide.

Part of sulfate-reducing bacteria B and hydrogen sulfide having moved from obligatory anaerobic layer 4 to anaerobic space 3 pass through tube 18 to reach aerobic region 90 along with a slight stream generated by organic matter and the like infiltrating lower layers 4 to 6. As described earlier, hydrogen sulfide reacts with iron oxide in aerobic region 90 to generate iron sulfide. Although hydrogen sulfide is a toxic substance, it is discharged little by little from tube 18 and quickly reacts with iron oxide to generate less toxic iron sulfide. Accordingly, hydrogen sulfide will not damage hydrosphere organisms in aerobic region 90. Sulfate-reducing bacteria B having moved to aerobic region 90 bond with iron sulfide as depicted in FIG. 5 and are then deposited on the surfaces of coral layer 7 and aerobic layer 6. Sulfate-reducing bacteria B are obligatory anaerobic bacteria and cannot inhabit under an aerobic condition as described above. Iron sulfide reacts quite well with oxygen. Accordingly, sulfate-reducing bacteria B provided on surfaces thereof with iron sulfide are not affected by oxygen but are converted to be inhabitable even under an aerobic condition. Sulfate-reducing bacteria B acts to decompose organic matter if there is much organic matter nearby to be decomposed, whereas sulfate-reducing bacteria B comes into a dormant state if there is little organic matter nearby. Sulfate-reducing bacteria B in the dormant state restart activity if organic matter increases in amount. Hydrogen sulfide having moved to aerobic region 90 does not entirely react with iron sulfide, but part of hydrogen sulfide reacts with oxygen ($O_2$) in aerobic layer 6 as depicted in FIG. 5 to generate sulfuric acid that can be dissolved in breeding water 9 to become sulfate ions, or the remaining hydrogen sulfide reaches aerobic layer 6 or facultative anaerobic layer 5 without reacting. Iron sulfide in aerobic region 90 does not entirely bond with sulfate-reducing bacteria B, but part of the iron sulfide may be converted to sulfate ions or iron disulfide due to action of respective bacteria. Photosynthetic bacteria generates, from hydrogen sulfide, different sulfur compounds less toxic than hydrogen sulfide in aerobic region 90, coral layer 7, or aerobic layer 6, so that hydrogen sulfide is reduced in toxicity. In water cleaning system 1, organic matter is biologically filtered in the three steps by activity of bacteria respectively in aerobic layer 6, facultative anaerobic layer 5, and obligatory anaerobic layer 4 to be reduced in toxicity and circulate in retention tank 2. Furthermore, a hydrogen sulfide toxicity reducing region 143 (see FIG. 4) is artificially formed in a short period of time, where hydrogen sulfide can be reduced in toxicity by activity of bacteria and the like in at least any one of aerobic region 90, coral layer 7, aerobic layer 6, facultative anaerobic layer 5, obligatory anaerobic layer 4, and anaerobic space 3. Breeding water 9 containing such organic matter has a cleaning effect substantially equal to a natural cleaning effect (at the bottom of the sea, for example).

Obligatory anaerobic layer 4 may be further provided thereabove with an anaerobic layer for biological filtering in the four steps, depending on thicknesses of layers 4 to 6, the amount of dissolved oxygen, and the like. Water cleaning system 1 configured identically may have bacteria of different types and the like multiplying in the respective layers. Depending on the types and the like of bacteria thus multiplied, at least any one of these mechanisms for reduction in toxicity of hydrogen sulfide may not function or hydrogen sulfide may be reduced in toxicity by a mechanism other than those described above.

Water cleaning system 1 according to the present embodiment can be constructed not by including water cleaning unit 100 but by including a structure corresponding to water cleaning unit 100 in breeding water 9. However, in the case where no water cleaning unit 100 is provided, a sufficient number of hydrosphere organisms cannot be bred from the beginning. The startup process is preferably performed for about several months so that bacteria can be settled respectively in layers 4 to 6 and organic matter can circulate stably. Specifically, in place of water cleaning unit 100, hollow member 30, to which plate member 31 and meshed member 32 are attached, and a cylindrical member such as tube 18, are installed on inner bottom surface 2c of retention tank 2, andosol 40, sand 50, and coral sand 70 are sequentially supplied thereon, and retention tank 2 is filled with breeding water 9, so as to achieve the state depicted in FIG. 4. In this case, sand 50 is preferably collected at the bottom of the sea or the like originally inhabited by aerobic bacteria and facultative anaerobic bacteria, for example. These bacteria are thus likely to be settled in aerobic layer 6 and facultative anaerobic layer 5 during startup of water cleaning system 1 with a shorter period of time required for the startup.

Figure 6:
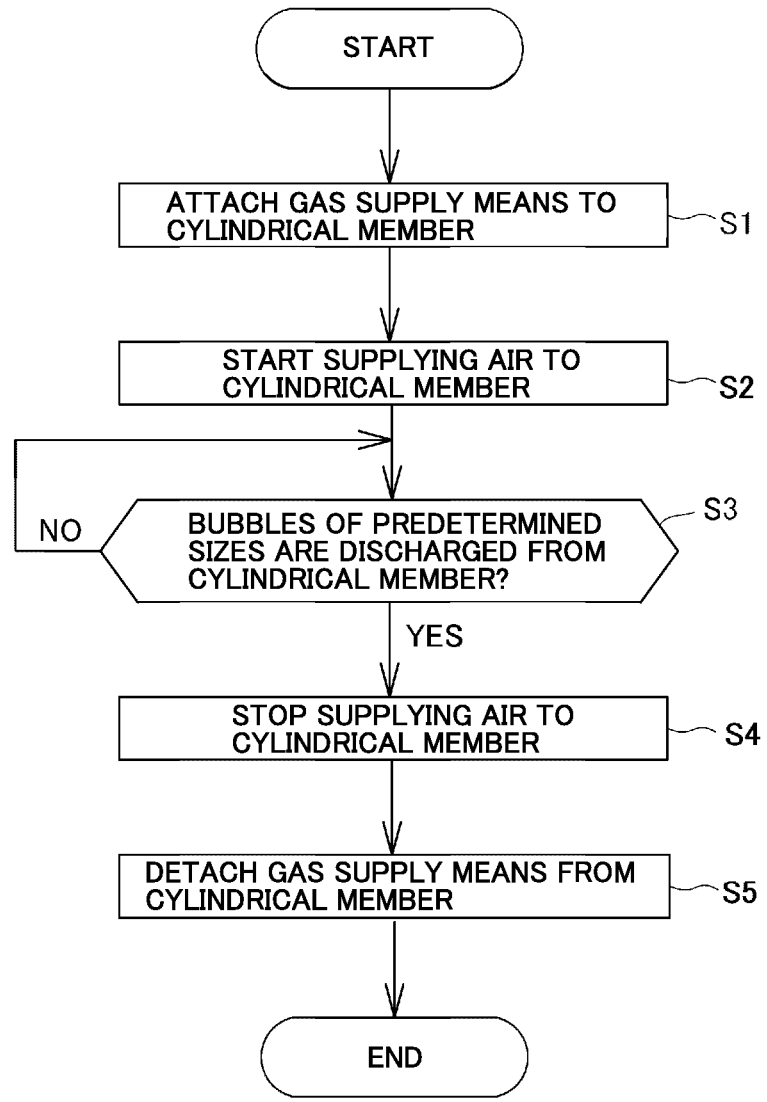
FIG. 6 is an explanatory flowchart of a startup method for the cleaning system.

In order to start up water cleaning system 1 in such a state, gas supply means 80 as in FIG. 4 is initially attached to the cylindrical member as depicted in FIG. 6 (step S1). Gas supply means 80 is preferably attached as low as possible in a range above obligatory anaerobic layer 4. Gas supply means 80 can be attached when sand 50 is accumulated on the surface of andosol 40 configuring obligatory anaerobic layer 4. Hydrosphere organisms are released in aerobic region 90 in retention tank 2 and light is applied to retention tank 2 at least from above threreof. The processes of releasing hydrosphere organisms and applying light are performed in an appropriate step, and can be performed prior to step S1, for example. The number of hydrosphere organisms released in retention tank 2 at this stage is made smaller than the breedable number in water cleaning system 1 having been started up. Retention tank 2 can be irradiated with light from above using a light source such as a fluorescent lamp (not depicted). Retention tank 2 can be alternatively placed at a place receiving sunlight, so that light is applied thereto. Still alternatively, retention tank 2 can be supplied with organic matter derived from organisms, instead of releasing hydrosphere organisms.

Subsequently started is supply of air from gas supply means 80 to the cylindrical member (step S2). Breeding water 9 in the cylindrical member is thus gradually pressed upward by air. The cylindrical member is thus provided therein with a stream from anaerobic space 3 toward aerobic region 90 and air is discharged from the cylindrical member as small bubbles. The cylindrical member is thus provided outside thereof with a stream from aerobic region 90 toward obligatory anaerobic layer 4. Gas supplied from gas supply means 80 is not limited to air insofar as the gas is not toxic.

This state is kept and size of the bubbles discharged from the cylindrical member is observed for a predetermined period of time (e.g. about three to six months) to visually determine whether or not the bubbles discharged from the cylindrical member are increased in size and predetermined size of bubbles are discharged (step S3). Sand 50 configuring aerobic layer 6 and facultative anaerobic layer 5 and andosol 40 configuring obligatory anaerobic layer 4 are pressed by the downward stream during the above period of time, so that breeding water 9 becomes unlikely to infiltrate obligatory anaerobic layer 4. Accordingly, oxygen and incident light are gradually decreased in amount toward downward from aerobic layer 6. Furthermore, aerobic bacteria, facultative anaerobic bacteria, and obligatory anaerobic bacteria multiply in aerobic layer 6, facultative anaerobic layer 5, and obligatory anaerobic layer 4, respectively. Breeding water 9 flowing inside the cylindrical member decreases, whereas air supplied from gas supply means 80 is unlikely to flow upward, is clogged halfway, and is discharged as larger bubbles from the cylindrical member. If bubbles of predetermined size are not discharged from the cylindrical member (NO in step S3), andosol 40 is determined as not being sufficiently pressed and the above state is kept. If bubbles of the predetermined size are discharged from the cylindrical member after elapse of several months (YES in step S3), andosol 40 is determined as being sufficiently pressed and supply of air to the cylindrical member is stopped (step S4). Bacteria most appropriate for environments in layers 4 to 6 are settled in layers 4 to 6 at this stage, and the startup of water cleaning system 1 is completed by detaching gas supply means 80 from the cylindrical member (step S5). Such a startup process is preferably performed for about several months.

Gas supply means 80 can be replaced with a pump and breeding water 9 can be sucked from second end 18b (see FIG. 4) of the cylindrical member such as tube 18 so as to generate a stream from anaerobic space 3 toward aerobic region 90 in the cylindrical member. Even in a case where such a startup process is not performed but water cleaning system 1 is started with a limited number of hydrosphere organisms, sand 50 and andosol 40 are gradually pressed and the respective bacteria multiply and are settled gradually in layers 4 to 6. Accordingly, the startup process is not essential in this case.

Figure 7:
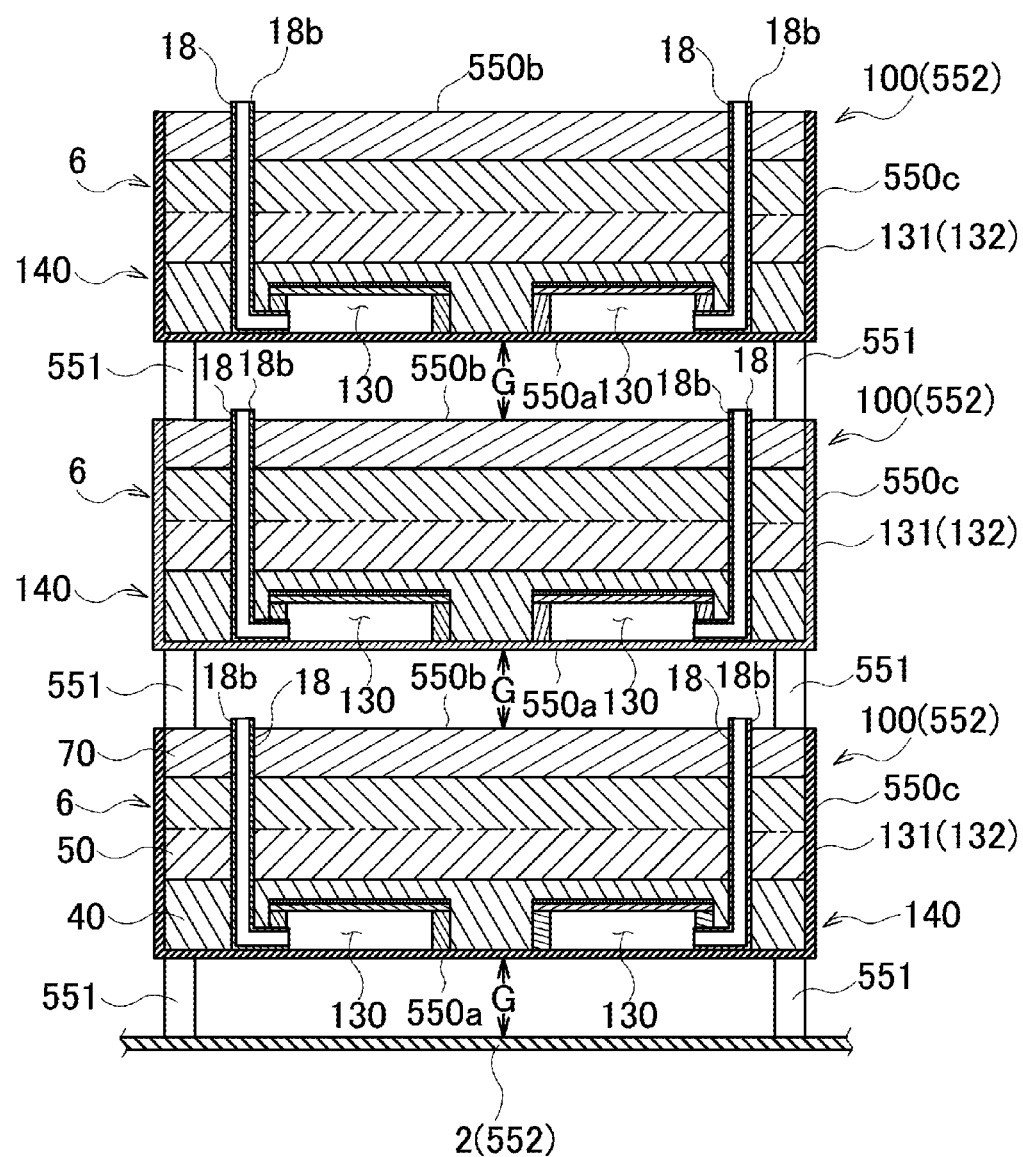
FIG. 7 is a sectional view of a state where a support leg is further attached to the cleaning unit.

As depicted in FIG. 7, water cleaning unit 100 can be provided with a support leg 551 securing a predetermined gap G from retention tank 2 serving as an installation surface 552 or different water cleaning unit 100. Support leg 551 in water cleaning unit 100 depicted in this figure extends from a lower surface 550a of water cleaning unit 100. Support leg 551 can alternatively be provided to extend from an upper surface 550b or a side surface 550c. Alternatively, lower surface 550a or upper surface 550b of water cleaning unit 100 can be recessed across side surface 550c at a portion corresponding to second end 18b of tube 18 in different water cleaning unit 100, so that a plurality of water cleaning units 100 can be appropriately stacked similarly to the case of providing support leg 551. Still alternatively, a support leg can be provided to a different water cleaning unit to be described later or a surface of a different water cleaning unit can be recessed as described above. The different water cleaning unit and water cleaning unit 100 can be stacked together.

As depicted in FIG. 4, the linking means (tube 18) is entirely provided inside retention tank 2 in water cleaning system 1 according to the present embodiment. Alternatively, the linking means extending from anaerobic space 3 can penetrate a side surface 2a of retention tank 2, extend upward outside retention tank 2, and penetrate side surface 2a of retention tank 2 again to reach aerobic region 90. The same applies to water cleaning systems 210 and 750 to be described later.

If meshed member 32 is strong enough to be durable against weight of obligatory anaerobic layer 4, facultative anaerobic layer 5, aerobic layer 6, and the like, meshed member 32 can be mounted directly on the upper surface of hollow member 30 without plate member 31 being interposed therebetween.

Furthermore, in water cleaning system 1, first bacteria inhabitable portion 140, to which surrounding member 131 is not attached, can be installed on inner bottom surface 2c of retention tank 2 to form the closed space. In this case, retention tank 2 and water cleaning unit 100 configure closed space forming means for forming the closed space. If andosol 40 of first bacteria inhabitable portion 140 does not loosen, there is no need to provide at least any one of hollow member 30, plate member 31, and meshed member 32.

As described above, water cleaning system 1 according to the first embodiment of the present invention includes aerobic region 90 including breeding water 9 containing organic matter derived from hydrosphere organisms and oxygen, aerobic layer 6 linking with aerobic region 90 and inhabited by aerobic bacteria, facultative anaerobic layer 5 provided adjacent to aerobic layer 6 and inhabited by facultative anaerobic bacteria, obligatory anaerobic layer 4 provided adjacent to facultative anaerobic layer 5, inhabited by obligatory anaerobic bacteria, and made of andosol 40, anaerobic space 3 having an anaerobic environment, allowing the obligatory anaerobic bacteria inhabiting obligatory anaerobic layer 4 and products therefrom to flow therein, and tube 18 as linking means linking anaerobic space 3 and aerobic region 90.

In water cleaning system 1 thus configured, organic matter in breeding water 9 reaches aerobic layer 6 and subsequently reaches facultative anaerobic layer 5, to be decomposed by aerobic bacteria and facultative anaerobic bacteria respectively inhabiting the layers. Decomposed matter thus obtained subsequently reaches obligatory anaerobic layer 4 and is decomposed by obligatory anaerobic bacteria. At this stage, sulfate-reducing bacteria B serving as obligatory anaerobic bacteria generate hydrogen sulfide from sulfur compounds. Hydrogen sulfide thus generated is reduced in toxicity in hydrogen sulfide toxicity reducing region 143 that is formed in at least one of aerobic region 90, aerobic layer 6, facultative anaerobic layer 5, obligatory anaerobic layer 4, and anaerobic space 3. Specifically, hydrogen sulfide is reduced in toxicity by reacting with an iron component in breeding water 9 while moving to aerobic region 90 together with sulfate-reducing bacteria B to form iron sulfide (FeS) less toxic to hydrosphere organisms than hydrogen sulfide, or by being converted to different sulfur compounds less toxic to hydrosphere organisms than hydrogen sulfide by sulfur oxidizing bacteria, photosynthetic bacteria, and the like inhabiting hydrogen sulfide toxicity reducing region 143. Sulfate-reducing bacteria B having moved to aerobic region 90 become inhabitable even in an aerobic environment by reaction with iron sulfide. Sulfate-reducing bacteria B reach the surface of the aerobic layer and decompose organic matter if the organic matter therein is relatively large in amount but come into a dormant state if the organic matter therein is relatively small in amount so as to increase the amount of organic matter to be decomposed. Decomposition of organic matter derived from hydrosphere organisms and contained in breeding water 9 as well as reduction in toxicity of hydrogen sulfide generated through the decomposition as described above can inhibit accumulation of toxic matter in retention tank 2 neither with a separate device for supplementing a filtering function nor with processes of replacing water and sand semipermanently or for a long period of time, and can clean breeding water 9 in retention tank 2. Furthermore, there is no need to reduce the number of bred hydrosphere organisms even after hydrosphere organisms have grown but the number of breedable hydrosphere organisms can be increased in comparison to a conventional case.

Opening 30a of hollow member 30 having the open top is closed by meshed member 32 that has water permeability and blocks passage of andosol 40. The peripheries of hollow member 30 and meshed member 32 are covered with andosol 40 to form anaerobic space 3 inside hollow member 30. Anaerobic space 3 can thus be easily formed and be kept for a long period of time.

Furthermore, sulfate-reducing bacteria B originally inhabit andosol 40. Obligatory anaerobic layer 4 made of andosol 40 allows sulfate-reducing bacteria B to multiply easily and reliably so as to form obligatory anaerobic layer 4 that can decompose a sufficient amount of organic matter.

Aerobic layer 6 is provided on the surface with coral layer 7 made of coral sand 70, so that calcium carbonate elutes from coral sand 70 to keep breeding water 9 slightly alkaline similarly to seawater. Accordingly, the interior of retention tank 2 can be kept in an environment appropriate for breeding of saltwater fishes, and deterioration in activity of sulfate-reducing bacteria B can be inhibited.

A water quality conditioning agent containing calcium carbonate, eggshell, a substance similarly having a function of eluting a calcium carbonate component into breeding water 9, or the like can replace or can be provided along with coral sand 70. Alternatively, the water quality conditioning agent, the eggshell, or the like can be provided to adjust neutralized or acidified breeding water 9 to be slightly alkaline. Breeding water 9 is neutralized or acidified because retention tank 2 contains a large or extremely small amount of organic matter such as excrement, for example. If a large amount of organic matter is contained, decomposition of the organic matter can be promoted by adjusting breeding water 9 to be slightly alkaline. It is possible to activate again sulfate-reducing bacteria B having significantly deteriorated decomposing ability due to an extremely small amount of organic matter. In a case where retention tank 2 is likely to receive an acid substance, e.g. when retention tank 2 placed outdoors tends to receive acid rain, it is preferred to preliminarily add the water quality conditioning agent, the eggshell, or the like.

A water cleaning method according to the first embodiment of the present invention is adopted as a method of breeding hydrosphere organisms. The method includes installing, in breeding water 9, first bacteria inhabitable portion 140 in a massive shape obtained by preliminarily pressing andosol 40 serving as a soil material inhabitable by obligatory anaerobic bacteria, forming, in breeding water 9, second bacteria inhabitable portion 141 that is adjacent to first bacteria inhabitable portion 140, has sand 50 as a particulate carrier, and is inhabitable by facultative anaerobic bacteria, third bacteria inhabitable portion 142 that is adjacent to second bacteria inhabitable portion 141, has sand 50, and is inhabitable by aerobic bacteria, anaerobic space 3 that has an anaerobic environment and links with first bacteria inhabitable portion 140, positioning to link with third bacteria inhabitable portion 142, aerobic region 90 including organic matter derived from hydrosphere organisms and oxygen, linking aerobic region 90 and anaerobic space 3, thus forming obligatory anaerobic layer 4 by multiplying obligatory anaerobic bacteria in first bacteria inhabitable portion 140, forming facultative anaerobic layer 5 by multiplying facultative anaerobic bacteria in second bacteria inhabitable portion 141, forming aerobic layer 6 by multiplying aerobic bacteria in third bacteria inhabitable portion 142, causing these bacteria to decompose the organic matter, and moving obligatory anaerobic bacteria flowing out of first bacteria inhabitable portion 140 and products therefrom from anaerobic space 3 to aerobic region 90.

In accordance with such a water cleaning method, aerobic region 90 including bred hydrosphere organisms or the like and organic matter derived from hydrosphere organisms is positioned to link with third bacteria inhabitable portion 142 so that aerobic region 90 and anaerobic space 3 link with each other. Accordingly, obligatory anaerobic bacteria multiply in first bacteria inhabitable portion 140 to form obligatory anaerobic layer 4, facultative anaerobic bacteria multiply in second bacteria inhabitable portion 141 to form facultative anaerobic layer 5, and aerobic bacteria multiply in third bacteria inhabitable portion 142 to form aerobic layer 6. Similarly to water cleaning system 1 according to the present invention, decomposition of organic matter derived from hydrosphere organisms and contained in water as well as reduction in toxicity of hydrogen sulfide generated through the decomposition can thus inhibit accumulation of toxic matter derived from the organic matter in retention tank 2 neither with a separate device for supplementing a filtering function nor with processes of replacing water and sand semipermanently or for a long period of time. Furthermore, there is no need to reduce the number of bred hydrosphere organisms even after hydrosphere organisms have grown but the number of breedable hydrosphere organisms can be increased in comparison to a conventional case. Furthermore, provision of first bacteria inhabitable portion 140 preliminarily pressed into a massive shape enables artificial formation of a decomposition cycle of organic matter for causing the reduction in toxicity of hydrogen sulfide at a desired position in a short period of time.

In order to start up water cleaning system 1, using tube 18 serving as a cylindrical member embodying the linking means, light is applied to aerobic layer 6 and gas is supplied from gas supply means 80 into tube 18 in the state where a breeding space 90 includes organic matter derived from organisms so as to cause a stream from anaerobic space 3 toward above aerobic layer 6 in tube 18 and keep this state for a predetermined period of time.

Breeding water 9 in tube 18 thus flows upward toward breeding space 90, so that breeding water 9 flows downward toward aerobic layer 6, facultative anaerobic layer 5, and obligatory anaerobic layer 4. Sand 50 configuring aerobic layer 6 and facultative anaerobic layer 5 and andosol 40 configuring obligatory anaerobic layer 4 are pressed by the downward stream, breeding water 9 passing through layers 4 to 6 is gradually reduced and lower layers 5 and 6 have a less amount of oxygen and a less amount of incident light. Accordingly, layers 4 to 6 have environments appropriate for inhabitation by aerobic bacteria, facultative anaerobic bacteria, and obligatory anaerobic bacteria, respectively, and these bacteria are sufficiently settled in layers 4 to 6. Water cleaning system 1 can thus be started up stably.

Water cleaning unit 100 is used to achieve the water cleaning method and water cleaning system 1. Water cleaning unit 100 includes bacteria inhabitable portion 140 made of andosol 40, having a massive shape, and inhabitable by obligatory anaerobic bacteria, closed space 130 surrounded with closing means 132 at least partially configured by bacteria inhabitable portion 140, and tube 18 as a cylindrical member that has first open portion 18ab and second open portion 18ba, has a length so as to extend from closed space 130 through closing means 132, with second open portion 18ba being positioned apart from bacteria inhabitable portion 140 by first distance L1 when first open portion 18ab is positioned to face closed space 130.

In this configuration, second open portion 18ba of tube 18 is positioned apart from bacteria inhabitable portion 140 by first distance L1 when first open portion 18ab is positioned to face closed space 130. Accordingly, aerobic region 90, aerobic layer 6, facultative anaerobic layer 5, obligatory anaerobic layer 4, and anaerobic space 3 linking with aerobic region 90 can be easily formed with second open portion 18ba not closed by sand 50 and the like when sand 50 and the like are supplied to form aerobic layer 6 and facultative anaerobic layer 5 on second surface 140a provided with tube 18 projecting therefrom, in second direction Y of bacteria inhabitable portion 140. When water cleaning unit 100 is immersed in breeding water 9 containing organic matter derived from hydrosphere organisms, closed space 130 configures anaerobic space 3 having an anaerobic environment and obligatory anaerobic bacteria and products therefrom can move from first open portion 18ab toward second open portion 18ba. Use of water cleaning unit 100 enables easy formation of first bacteria inhabitable portion 140 obtained by pressing andosol 40 into a massive shape in breeding water 9, and reduction in startup period of time for achieving sufficient decomposition of organic matter as depicted in FIG. 5.

In bacteria inhabitable portion 140, surrounding member 131 blocking passage of a soil material covers both surfaces 140b in first direction X as the surfaces with no tube 18 projecting therefrom and first surface 140c in second direction Y. This configuration can inhibit crumbling of bacteria inhabitable portion 140 due to loosening of the soil material and flowing of the soil material out of water cleaning unit 100 immersed in breeding water 9.

Surrounding member 131 further has a light shielding property so as to prevent without time or effort light from entering closed space 130 in water cleaning system 1 that includes water cleaning unit 100 and typically used transparent retention tank 2.

Water cleaning unit 100 is provided, between first bacteria inhabitable portion 140 and closed space 130, with meshed member 32 having water permeability and blocking passage of andosol 40, so as to inhibit andosol 40 from entering closed space 130 (anaerobic space 3).

There is further included sand 50 as a particulate carrier inhabitable by aerobic bacteria and facultative anaerobic bacteria in order to form second bacteria inhabitable portion 141 that is adjacent to first bacteria inhabitable portion 140 inhabitable by obligatory anaerobic bacteria and is inhabitable by facultative anaerobic bacteria, and third bacteria inhabitable portion 142 that is adjacent to second bacteria inhabitable portion 141 and inhabitable by aerobic bacteria. Use of water cleaning unit 100 thus configured eliminates necessity for supplying sand 50 and the like to form aerobic layer 6 and facultative anaerobic layer 5 as depicted in FIG. 4. This can reduce time and effort for forming water cleaning system 1. The particulate carrier used for forming each of aerobic layer 6 and facultative anaerobic layer 5 can be of a different type.

At least bacteria inhabitable portion 140 is dry in water cleaning unit 100, to achieve reduction in weight and facilitate delivery.

Water cleaning unit 100 includes support leg 551 securing predetermined gap G between retention tank 2 serving as installation surface 552 and different water cleaning unit 100. A plurality of water cleaning units 100 can be stacked and installed without closing second end 18b of tube 18. Furthermore, organic matter and oxygen in breeding water 9 can sufficiently enter aerobic layer 6 of different water cleaning unit 100 located at a first end in second direction Y. As the number of water cleaning units 100 increases in this manner, organic matter to be decomposed can be increase in amount and decomposing ability can be improved. Furthermore, water cleaning unit 100 can be easily located horizontally even in a case where the bottom of the sea, the bottom of a river, or the like to be mounted with water cleaning unit 100 is uneven to some extent due to rocks or the like.

<Second Embodiment>

The second embodiment according to the present invention will now be described next with reference to FIGS. 8 to 10. Those members similar in shape, material, and the like will be denoted by identical reference signs and will not be described repeatedly.

Figure 8:
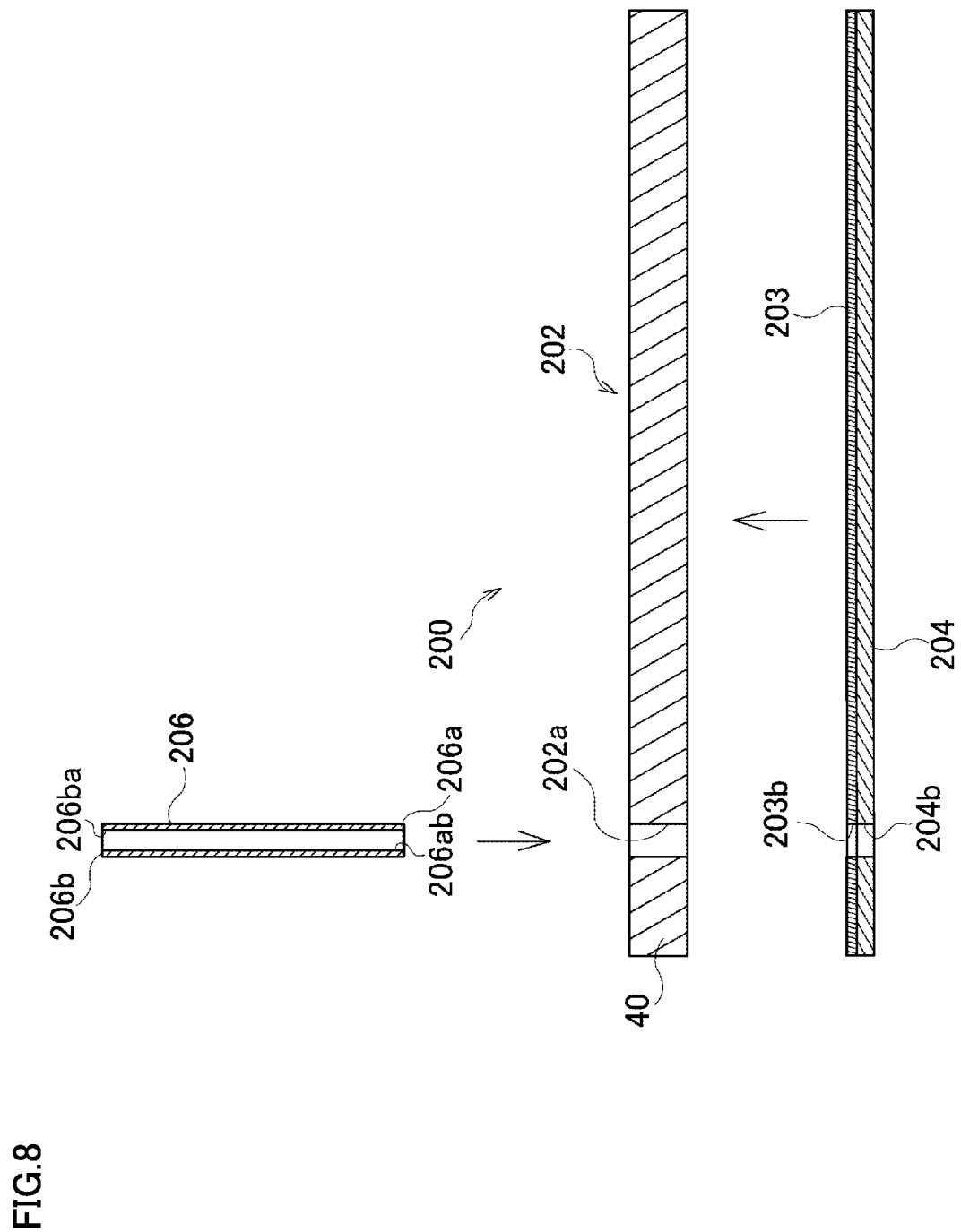
FIG. 8 is a sectional view of a water cleaning unit according to a second embodiment of the present invention.
Figure 9:
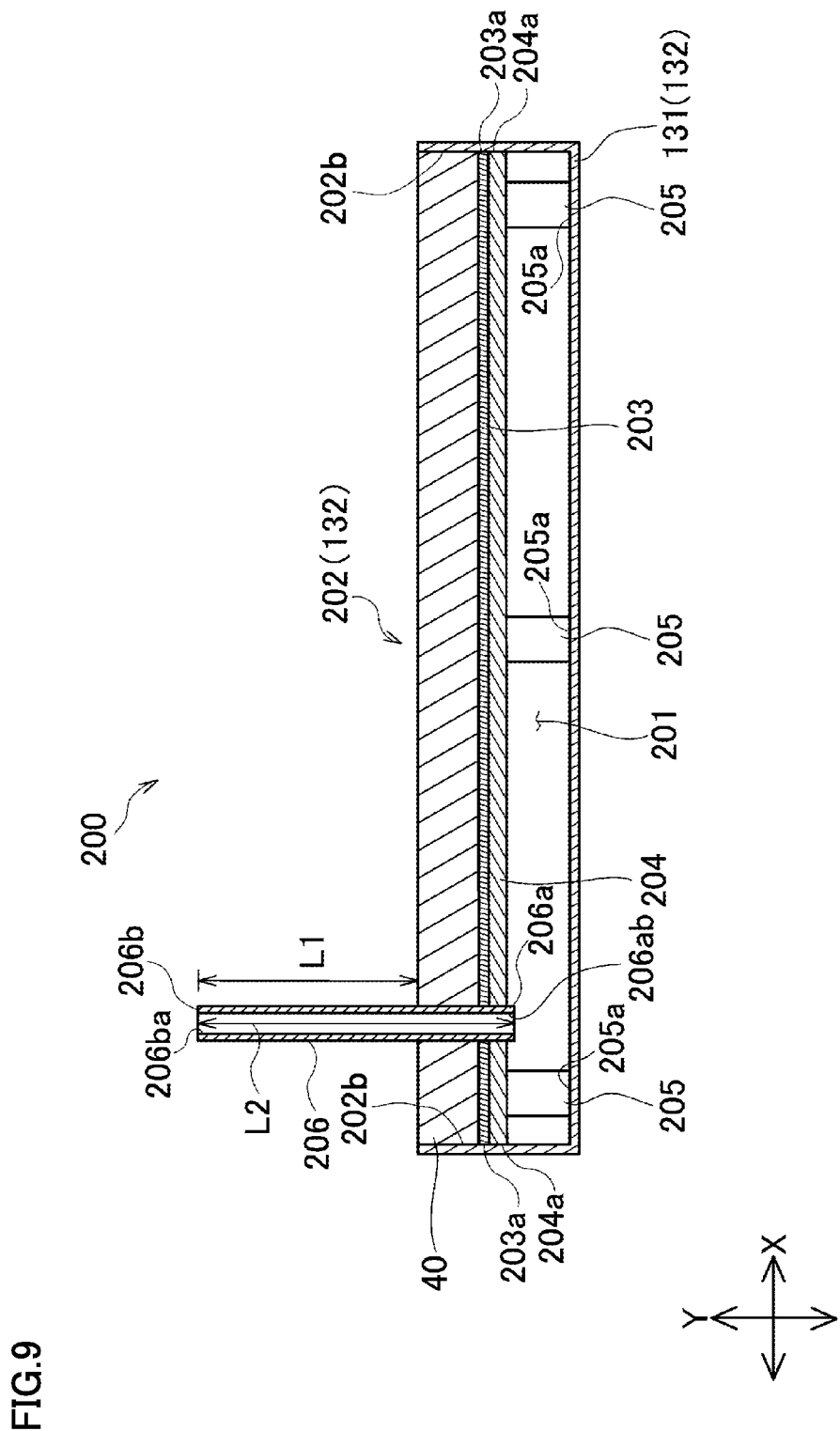
FIG. 9 is a sectional view of a state where a cylindrical member and the like are attached to the cleaning unit.

As depicted in FIG. 8, water cleaning unit 200 according to this embodiment is provided with cylindrical member insertion holes 202a, 203b, and 204b as penetrating portions penetrating in second direction Y (vertically in the present embodiment) a bacteria inhabitable portion 202 made of a soil material, having a massive shape, and inhabitable by obligatory anaerobic bacteria, a meshed member 203, and a plate member 204. In order to use water cleaning unit 200, plate member 204 having substantially rectangular shape and a second (upper) surface in second direction Y (in the vertical direction in the present embodiment) entirely covered with meshed member 203 is attached to bacteria inhabitable portion 202, and a pipe 206 having a linear shape in a side view and serving as linking means (cylindrical member) is inserted to cylindrical member insertion holes 202a, 203b, and 204b. Pipe 206 is provided with a first open portion 206ab and a second open portion 206ba apart from each other by second distance L2 in the extending direction. Open portions 206ab and 206ba are provided at the respective ends in the present embodiment. First open portion 206ab is positioned to face a first end of bacteria inhabitable portion 202 whereas second open portion 206ba projects from bacteria inhabitable portion 202 at a second end of bacteria inhabitable portion 202 and is positioned apart from bacteria inhabitable portion 202 by first distance L1. A plurality of support means 205 in pillar shapes depicted in FIG. 9 is attached to a first end in second direction Y (the lower side in the present embodiment) of plate member 204. Furthermore, surrounding member 131 is provided to be in contact with both surfaces 202b in first direction X (in the horizontal direction in the present embodiment) of bacteria inhabitable portion 202 that is provided adjacent to a second end in second direction Y of meshed member 203, both end surfaces 203a in first direction X of meshed member 203, both end surfaces 204a in first direction X of plate member 204 and a first surface 205a in second direction Y of support means 205. Bacteria inhabitable portion 202 and surrounding member 131 thus configure closing means 132 to form a closed space 201 surrounded with bacteria inhabitable portion 202 and surrounding member 131. Pipe 206 extends from closed space 201 through plate member 204, meshed member 203, and bacteria inhabitable portion 202. Open portions 206ab and 206ba of pipe 206 are not particularly limited insofar as open portions 206ab and 206ba are provided at positions allowing an anaerobic space 213 and aerobic region 90 to link with each other in water cleaning system 210 to be described later (see FIG. 10). Open portions 206ab and 206ba can be provided not at the ends but at the center in the extending direction of pipe 206. Plate member 204 is made of a material similar to that for plate member 31 according to the first embodiment, and meshed member 203 is made of a material similar to that for meshed member 32 according to the first embodiment. A pipe 206 can be inserted so as to penetrate bacteria inhabitable portion 202 as in the present embodiment, or can be inserted only halfway to bacteria inhabitable portion 202.

Figure 10:
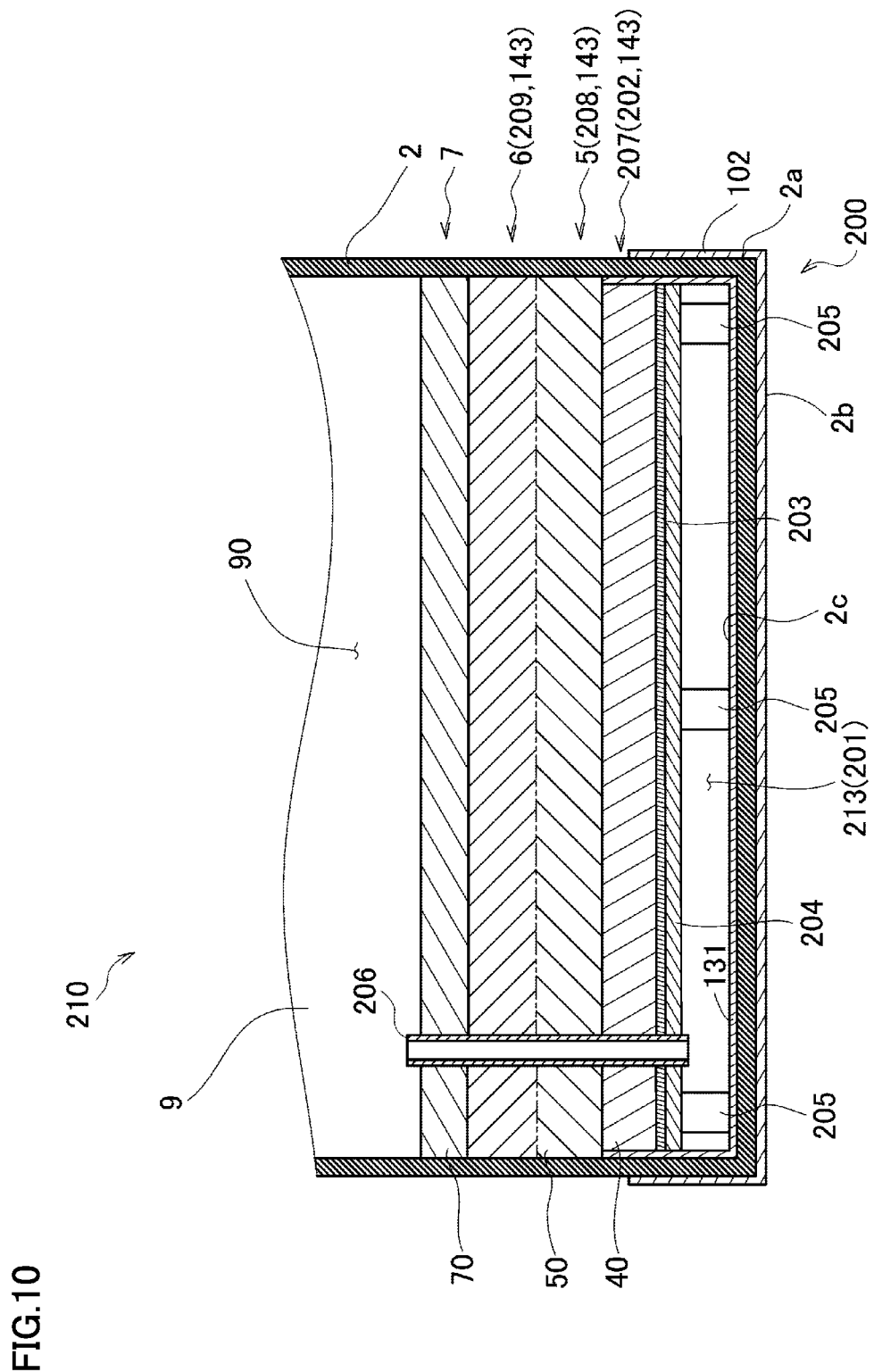
FIG. 10 is a sectional view of a water cleaning system according to the second embodiment provided with the cleaning unit.

After water cleaning unit 200 is mounted on inner bottom surface 2c of retention tank 2 as depicted in FIG. 10, sand 50 (or gravel) and coral sand 70 are sequentially accumulated on the surface of bacteria inhabitable portion 202 and retention tank 2 is further filled with breeding water 9. A nontransmissive portion 102 is provided at a lower portion of side surface 2a and on bottom surface 2b of retention tank 2 so as to prevent light from entering closed space 201. Nontransmissive portion 102 can be provided by attaching a tape, a seal, or the like in black to the lower portion of side surface 2a and to bottom surface 2b of retention tank 2. In a case where retention tank 2 has nontransmittivity, there is no need to provide nontransmissive portion 102. By keeping the state where breeding water 9 contains organic matter derived from hydrosphere organisms for a certain period of time, obligatory anaerobic bacteria multiply in bacteria inhabitable portion (first bacteria inhabitable portion) 202 to form an obligatory anaerobic layer 207. Facultative anaerobic bacteria multiply in a lower portion of the layer of sand 50 (a second bacteria inhabitable portion 208) to form facultative anaerobic layer 5 whereas aerobic bacteria multiply in an upper portion (a third bacteria inhabitable portion 209) to form aerobic layer 6. Closed space 201 is brought into an anaerobic environment so as to configure anaerobic space 213.

With use of water cleaning unit 200 in this manner, it is possible to form water cleaning system 210 according to the second embodiment of the present invention including coral layer 7, aerobic layer 6, facultative anaerobic layer 5, and obligatory anaerobic layer 207 that are formed from above, as well as anaerobic space 213 formed below obligatory anaerobic layer 207 and aerobic region 90 linked with each other by pipe 206. Water cleaning system 210 thus configured can circulate organic matter and exert the effects similarly to water cleaning system 1 depicted in FIG. 4 and described earlier. Furthermore, hydrogen sulfide can be reduced in toxicity in aerobic region 90, aerobic layer 6, facultative anaerobic layer 5, obligatory anaerobic layer 207, and anaerobic space 213, each serving as hydrogen sulfide toxicity reducing region 143.

In water cleaning unit 200 provided with neither support means 205 nor surrounding member 131, a plurality of pillar members serving as closed space forming means can be provided on inner bottom surface 2c of retention tank 2 that also serves as closed space forming means for forming closed space 201 along with water cleaning unit 200, and water cleaning unit 200 can be installed in retention tank 2, so that plate member 204 is lifted upward from inner bottom surface 2c by the pillar members and closed space 201 as depicted in FIG. 10 is formed at a first end in second direction Y of bacteria inhabitable portion 202. In this case, retention tank 2 is preferred to be provided with nontransmissive portion 102 as depicted in this figure or have a light shielding property. Closed space 201 provided at the first end in second direction Y of bacteria inhabitable portion 202 configures anaerobic space 213 when water cleaning system 210 is formed by accumulating sand 50 and the like at a second end in second direction Y of a water cleaning unit 250 and filling retention tank 2 with breeding water 9. If andosol 40 in bacteria inhabitable portion 202 does not loosen in water cleaning unit 250, neither plate member 204 nor meshed member 203 may be provided.

As described above, water cleaning unit 200 includes bacteria inhabitable portion 202 made of andosol 40, having a massive shape, and inhabitable by obligatory anaerobic bacteria, and pipe 206 as a cylindrical member that has first open portion 206ab and second open portion 206ba and has a length to extend from the first end to the second end of bacteria inhabitable portion 202, with second open portion 206ba positioned apart from bacteria inhabitable portion 202 by first distance L1 at the second end of bacteria inhabitable portion 202 when first open portion 206ab is positioned to face the first end of bacteria inhabitable portion 202.

In such a configuration, the water cleaning unit 200 is immersed in breeding water 9 containing organic matter derived from hydrosphere organisms, and sand 50 and the like are supplied to form aerobic layer 6 and facultative anaerobic layer 5 at the second end in second direction Y of bacteria inhabitable portion 202 provided with a second end 206b of pipe 206, so that closed space 201 can be provided at the first end of bacteria inhabitable portion 202 by using the pillar members as the closed space forming means. Second open portion 206ba is positioned apart from bacteria inhabitable portion 202 by first distance L1 when first open portion 206ab of pipe 206 is positioned to face the first end of bacteria inhabitable portion 202. Accordingly, aerobic region 90, aerobic layer 6, facultative anaerobic layer 5, obligatory anaerobic layer 207, and anaerobic space 213 linking with aerobic region 90 can be easily formed with second open portion 206ba not closed by sand 50 and the like. A first end 206a of pipe 206 is located in anaerobic space 213 configured by closed space 201 having an anaerobic environment and second end 206b of pipe 206 is located in aerobic region 90, so that obligatory anaerobic bacteria and products therefrom can move from first end 206a toward second end 206b. Water cleaning system 210 depicted in FIG. 10 can be configured easily also by including water cleaning unit 200.

<Third Embodiment>

Figure 11:
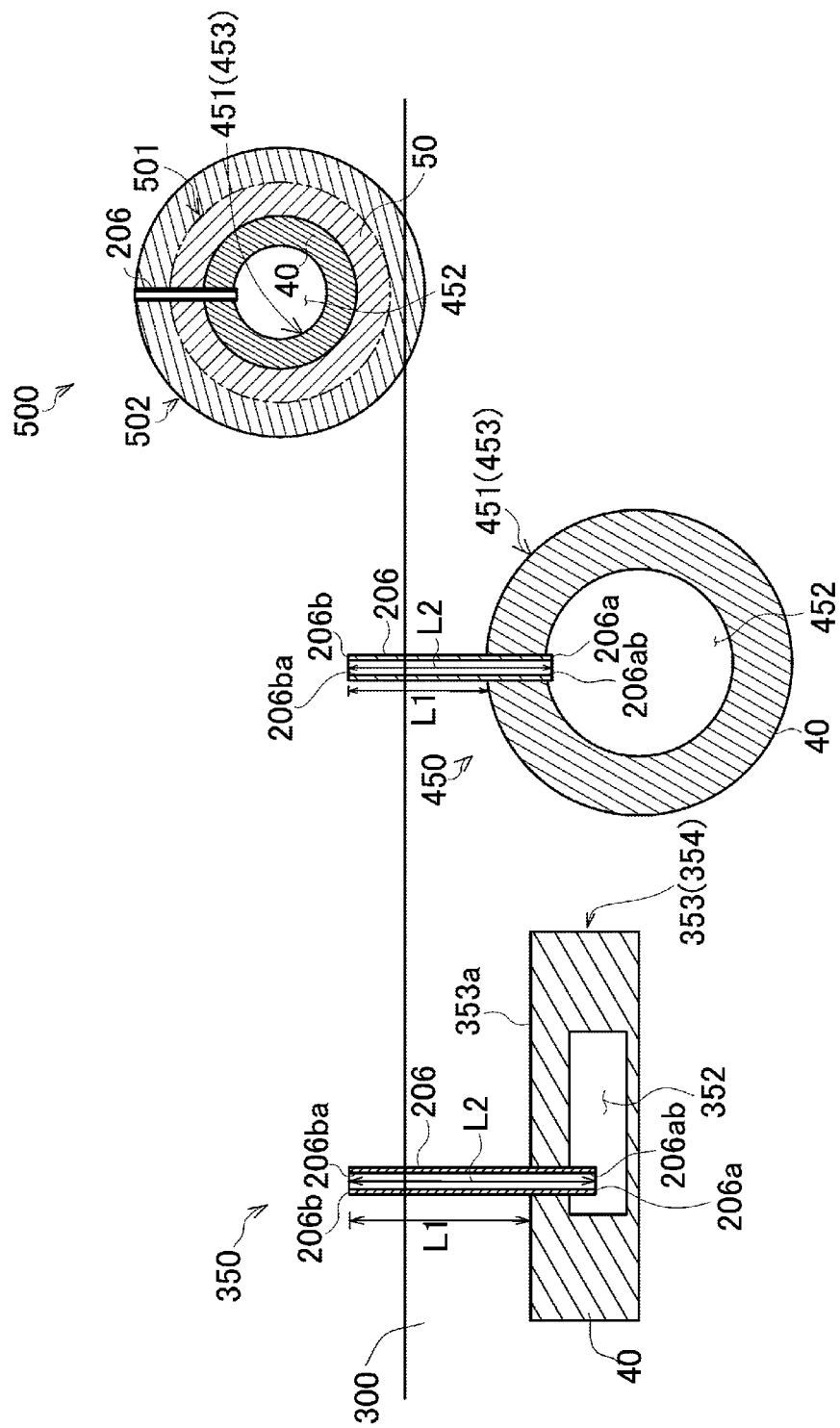
FIG. 11 is a sectional view of a water cleaning unit according to a third embodiment of the present invention.

The third embodiment according to the present invention will now be described next with reference to FIG. 11.

In a water cleaning unit 350 according to the third embodiment of the present invention, only a bacteria inhabitable portion 353 having a rectangular parallelepiped shape configures closing means 354 by forming a closed space 352 inside bacteria inhabitable portion 353. Pipe 206 is provided to penetrate bacteria inhabitable portion 353 with first end 206a located in closed space 352 and second end 206b positioned apart by first distance L1 from a second surface 353a in second direction Y of bacteria inhabitable portion 353.

In a water cleaning unit 450 also according to the third embodiment of the present invention, a spherical closed space 452 is formed at the center of a spherical bacteria inhabitable portion 451, pipe 206 extends from closed space 452 through bacteria inhabitable portion 451 serving as closing means 453, and second open portion 206ba provided at second end (extending end) 206b is opened at a position apart from bacteria inhabitable portion 451 by first distance L1. In a water cleaning unit 500 also according to the third embodiment of the present invention, in a case where bacteria inhabitable portion 451 is defined as a first bacteria inhabitable portion 451, a second bacteria inhabitable portion 501 having a spherical shape and inhabitable by facultative anaerobic bacteria is formed on a surface of first bacteria inhabitable portion 451 and a third bacteria inhabitable portion 502 having a spherical shape and inhabitable by aerobic bacteria is formed on a surface of second bacteria inhabitable portion 501. In a case of using water cleaning unit 350, 450, or the like including neither the second bacteria inhabitable portion nor the third bacteria inhabitable portion, sand 50 and the like can be supplied after water cleaning unit 350 or 450 is installed at the bottom of the sea, for example, or water cleaning unit 350 or 450 can be buried in sea sand 300 at the bottom of the sea.

<Fourth Embodiment>

Figure 12:
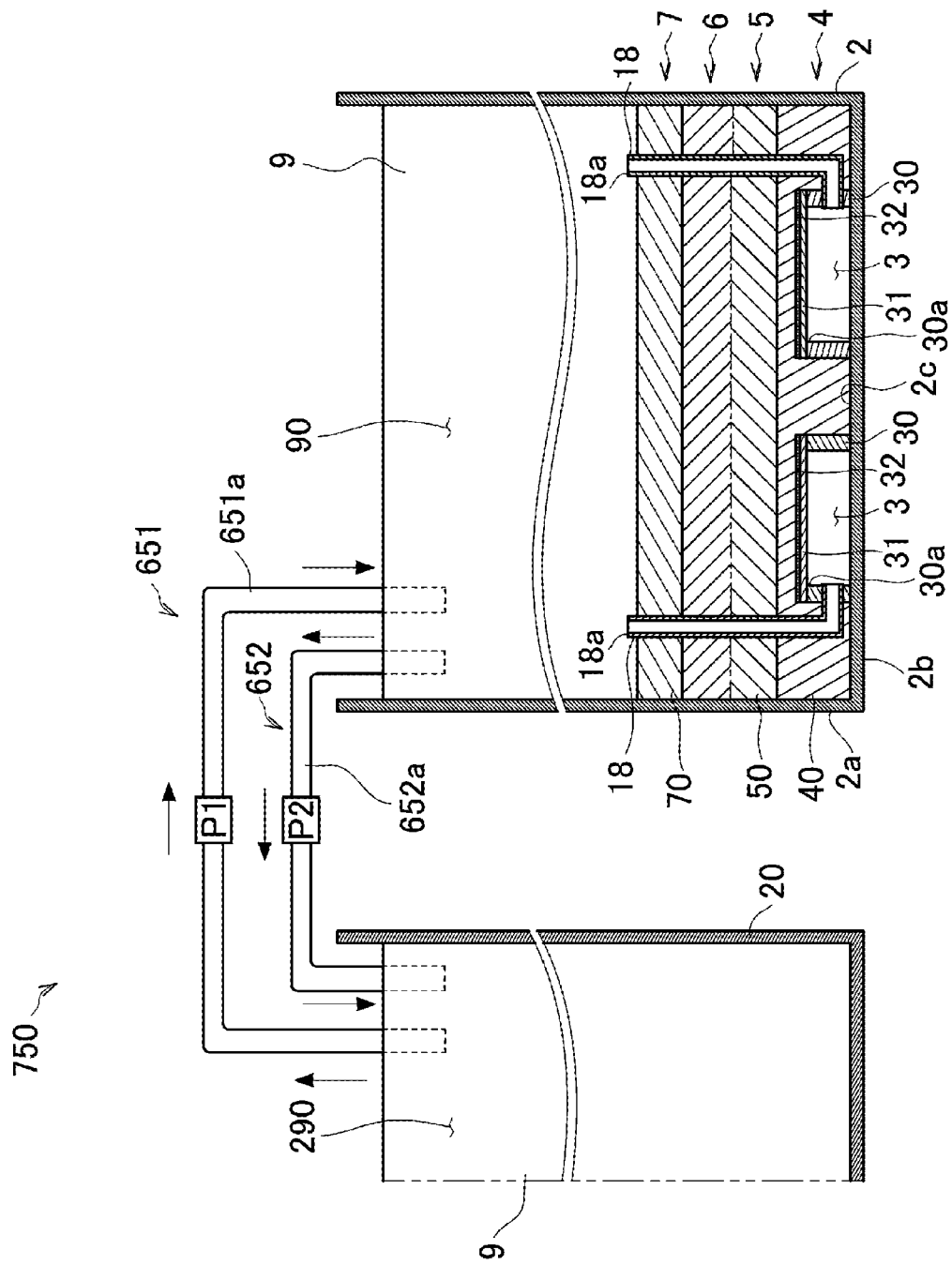
FIG. 12 is a sectional view of a water cleaning unit according to a modification example of the first embodiment.

The fourth embodiment according to the present invention will now be described next with reference to FIG. 12.

In water cleaning system 1 depicted in FIG. 4 and water cleaning system 210 depicted in FIG. 10, breeding water 9 contains organic matter derived from hydrosphere organisms that are bred in aerobic region 90. Alternatively, water containing organic matter derived from hydrosphere organisms can be supplied from a different place. As depicted in FIG. 12, retention tank 20 used for breeding hydrosphere organisms can be provided separately and breeding water 9 in retention tank 20 can be fed into retention tank 2.

Specifically, in a breeding system 750 according to the fourth embodiment of the present invention, a space 290 in retention tank 20 and aerobic region 90 in retention tank 2 are connected to each other by first water conveying means 651 and second water conveying means 652. Breeding water 9 in retention tank 20 is conveyed to retention tank 2 through first water conveying means 651 whereas breeding water 9 in retention tank 2 is conveyed to retention tank 20 through second water conveying means 652. First and second water conveying means 651 and 652 include pumps P1 and P2 and hoses 651a and 652a that are connected to pumps P1 and P2 and have ends inserted to space 290 in retention tank 20 and aerobic region 90 in retention tank 2, respectively. Alternatively, breeding water 9 in retention tank 2 may not be returned to retention tank 20 but can be conveyed to a different place. Pumps P1 and P2 and hoses 651a and 652a can be replaced with different members insofar as breeding water 9 can be conveyed to retention tanks 2 and 20.

The specific configurations of the portions are not to be limited respectively to the embodiments described above.

Examples of breeding water 9 included in water cleaning systems 1 and 210 include seawater and fresh water depending on the type of hydrosphere organisms. Furthermore, breeding water 9 can be replaced with water of any type containing organic matter. In a case where breeding water 9 is preferably kept neutral or slightly acid for breeding of freshwater fishes or the like, coral sand 70 and the like to be used are preferably reduced in amount to decrease the amount of calcium carbonate eluted into breeding water 9 in comparison to a case of keeping slightly alkaline. In the case where fresh water is used as breeding water 9, methanogen inhabit obligatory anaerobic layer 4 and acts similarly to sulfate-reducing bacteria B.

Two anaerobic spaces 3 are provided and tube 18 is inserted to each of anaerobic spaces 3 in the first embodiment of the present invention. Alternatively, anaerobic spaces 3 can be connected to each other by a cylindrical portion or the like and tube 18 can be inserted to only one of anaerobic spaces 3. In this configuration, sulfate-reducing bacteria B and hydrogen sulfide in anaerobic space 3 with no tube 18 being inserted thereto move to anaerobic space 3 provided with tube 18 by way of the cylindrical portion or the like and further move to aerobic region 90 or space 290 by way of anaerobic space 3.

The number of anaerobic spaces 3 provided in the first embodiment can be one, or greater than or equal to three. Similarly to the second embodiment, nontransmissive portion 102 can be provided at the lower portion of side surface 2a and on bottom surface 2b of retention tank 2 in the first embodiment. This configuration can prevent application of light to the side surface and the lower end of obligatory anaerobic layer 4 so as to allow obligatory anaerobic bacteria to multiply entirely in obligatory anaerobic layer 4. There is no need to provide nontransmissive portion 102 in a case where retention tank 2 does not allow transmission of light therethrough.

Water cleaning units 100, 200, 350, 450, and 500 (hereinafter, referred to as "water cleaning units 100 to 500" in order to collectively mention these water cleaning units) or the water cleaning method described above can be used or performed by sinking the water cleaning units in the sea, a lake, a pond, a river, or the like or in a farm for hydrosphere organisms included in the water cleaning units. In a typical hydrosphere organisms farm, part of the sea is surrounded with a net and hydrosphere organisms are bred therein in an overcrowded state. An amount of excrement exceeding the amount cleaned by natural cleaning capacity can be discharged to problematically contaminate the peripheral sea area. Use of water cleaning units 100 to 500 in such a farm achieves increase in amount of organic matter such as excrement to be decomposed and reduction in toxicity of hydrogen sulfide along with the natural cleaning capacity, to contribute to improvement in water quality and inhibit marine contamination caused by cultivation. Furthermore, there is no need to reduce the number of cultivated hydrosphere organisms even after hydrosphere organisms have grown but the number of cultivable hydrosphere organisms can be increased per unit volume in comparison to a conventional case. Retention tank 2 is not limited to a water tank, but can be a fish tank, concrete formed into a box shape having an open top, or the like. Water cleaning system 1, 210, or 750 can be used for cultivation (breeding) of hydrosphere organisms in a fish tank or the like. Still alternatively, a hole can be dug in the ground surface to accommodate water cleaning system 1, 210, or 750. A soil wall configuring the hole corresponds to retention tank 2 in this case.

The linking means (cylindrical member) in water cleaning systems 1, 210, and 750 and the cylindrical member in water cleaning units 100 to 500 are not limited to tube 18 and pipe 206 insofar as anaerobic space 3 or 213 (closed space 130 or 201) and aerobic region 90 can link with each other. For example, the linking means or the cylindrical member can be porous rock or the like that can be extended and has the second open portion at a position apart by first distance L1 from obligatory anaerobic layer 4 or 207 or first bacteria inhabitable portion 140, 202, 353, or 451. The linking means can be provided as a hole penetrating bacteria inhabitable portion 140, 141, 142, 202, 208, 209, 353, 451, 501, or 502 or each of layers 4 to 7. The hole can be used by itself without inserting a cylindrical member thereto.

Sea sand substantially equal in amount to andosol 40 can be further accumulated above aerobic layer 6. The sea sand layer and coral layer 7 can inhibit sand 50 configuring aerobic layer 6 from flying upward. In order to breed hydrosphere organisms such as flatfishes, shrimps, and crabs having a habit of digging sand, a net made of stainless steel and having meshes sized to block passage of hydrosphere organisms is preferably located above obligatory anaerobic layer 4 or 207, e.g. between coral layer 7 and aerobic layer 6. The net can prevent oxygen from entering obligatory anaerobic layer 4 or 207 due to hydrosphere organisms digging sand 50 and andosol 40 and prevent toxic hydrogen sulfide and the like generated in obligatory anaerobic layer 4 or 207 from flowing out to aerobic region 90 through a hole dug by hydrosphere organisms. The net is preferably sized and shaped to cover the entire surface of aerobic layer 6, and its material is not limited to stainless steel.

Water cleaning units 100 to 500 are not limited to include first bacteria inhabitable portions 140, 202, 353, and 451, second bacteria inhabitable portions 141, 208, and 501, and third bacteria inhabitable portions 142, 209, and 502 that are all dry. These bacteria inhabitable portions can contain moisture at a degree inhabitable by the bacteria. A sufficient number of the bacteria can preliminarily inhabit each of bacteria inhabitable portions 140, 202, 353, 451, 141, 208, 501, 142, 209, and 502.

Water cleaning system 1, 210, and 750 according to the present invention do not necessarily eliminate provision of a device for supplementing a filtering function such as an external filtration device or processes of replacing water and sand. Retention tank 2 can be additionally provided with bacteria such as aerobic bacteria.

The above embodiments define that first direction X is horizontal and second direction Y perpendicular thereto is vertical. Alternatively, first direction X can be vertical and second direction Y can be horizontal or in a different direction (e.g. slanted from the horizontal direction). In water cleaning system 1, 210, or 750 according to the present invention, aerobic layer 6, facultative anaerobic layer 5, and obligatory anaerobic layer 4 (207) can be formed in the mentioned order from below to above, or aerobic layer 6, facultative anaerobic layer 5, and obligatory anaerobic layer 4(207) can be formed laterally. Applicable to such a situation is a case where each of water cleaning units 100 to 500 according to the present invention is installed on an inner wall surface of a cave in the sea or the like.

In each of water cleaning units 100 to 500 according to the present invention, at least andosol 40 is preliminarily collected and pressed. Andosol 40 can be alternatively in a separate state. For example, each of water cleaning units 100 to 500 can include a particulate carrier that is the material for aerobic layer 6 and facultative anaerobic layer 5 and is pressed into a block shape, loose andosol 40 not pressed, hollow member 30, meshed member 32, and plate member 31 not fixed to each other, and tube 18 or pipe 206. Particulate carrier 50 as the material for aerobic layer 6 and facultative anaerobic layer 5 can be loose similarly to andosol 40. A water cleaning unit can include sand 50, coral sand 70, and the like that are packed not in block shapes but in loose states and are enclosed with each of water cleaning units 100 to 500.

A promoter for multiplication of obligatory anaerobic bacteria, facultative anaerobic bacteria, and aerobic bacteria (e.g. the bacteria themselves) can be supplied upon forming water cleaning system 1, 210, or 750.

The cylindrical member such as pipe 206 can be made to be extendable. Such a cylindrical member can prevent the second end of the cylindrical member from being buried in the layer due to accumulation of sand 50 and coral sand 70.

The remaining configurations can be modified variously within the range not departing from the gist of the present invention. For example, the closing means can be any member surrounding the closed space in order to bring the water cleaning unit according to the present invention immersed in water into an anaerobic state, even if the member is not disclosed in this description. Anything forming the closed space with respect to the water cleaning unit according to the present invention can serve as closed space forming means. Appropriate combination of the configurations according to the respective embodiments is included in the scope of the present invention.

INDUSTRIAL APPLICABILITY

The present invention described in detail above inhibits accumulation of toxic matter derived from organic matter discharged from hydrosphere organisms, reduces toxicity of hydrogen sulfide generated from organic matter derived from hydrosphere organisms due to activity of bacteria by converting into a less toxic substance, so as to be useful with none of requirements of a device for supplementing a filtering function and processes of replacing water and sand semipermanently or for a long period of time.

REFERENCE SIGNS LIST 1, 210, 750: Water cleaning system; 2: Retention tank; 3, 213: Anaerobic space; 4, 207: Obligatory anaerobic layer; 5: Facultative anaerobic layer; 6: Aerobic layer; 18ab, 206ab: First open portion; 18ba, 206ba: Second open portion; 9: Water (Breeding water); 18, 206: Linking means, Cylindrical member (Tube, Pipe); 30: Hollow member; 30a: Opening of hollow member; 32: Meshed member; 40: Soil material (Andosol); 50: Particulate carrier (Sand); 70: Coral sand; 90: Aerobic region; 100, 200, 350, 450, 500: Water cleaning unit; 102: Nontransmissive portion; 130, 201, 352, 452: Closed space; 132: Closing means; 140, 202, 353, 451: First bacteria inhabitable portion; 141, 208, 501: Second bacteria inhabitable portion; 142, 209, 502: Third bacteria inhabitable portion; 202a: Penetrating portion (Cylindrical member insertion hole); 551: Support leg; 552: Installation surface; G: Gap; L1; Predetermined distance (First distance)

The invention claimed is:

1. A water cleaning system comprising:
an aerobic region including water containing organic matter and oxygen;
an aerobic layer linking with the aerobic region and inhabited by aerobic bacteria;
a facultative anaerobic layer provided adjacent to the aerobic layer and inhabited by facultative anaerobic bacteria;
an obligatory anaerobic layer provided adjacent to the facultative anaerobic layer, inhabited by obligatory anaerobic bacteria, and made of a soil material;
an anaerobic space having an anaerobic environment, allowing the obligatory anaerobic bacteria inhabiting said obligatory anaerobic layer and products therefrom to flow therein; and
linking means linking the anaerobic space and said aerobic region.

2. The water cleaning system according to claim 1, wherein an opening at a top of a hollow member is closed by a meshed member having water permeability and blocking passage of said soil material, said soil material surrounds the hollow member and the meshed member to form said anaerobic space in said hollow member.

3. The water cleaning system according to claim 2, wherein said soil material is andosol.

4. The water cleaning system according to claim 3, wherein said aerobic layer is provided, on a surface thereof, with a layer made of coral sand.

5. The water cleaning system according to claim 1, wherein
said retention tank includes a nontransmissive portion blocking transmission of light from a lower portion in a side surface and from a bottom surface,
a meshed member having water permeability and blocking passage of said soil material is entirely provided at a lower portion in the retention tank so as to be apart from an inner bottom surface of said retention tank, the meshed member has an upper surface covered with said soil material and said anaerobic space is formed between the meshed member and said inner bottom surface.

6. A startup method for the water cleaning system according to claim 1, using a cylindrical member as said linking means, the method comprising:
applying light to said aerobic layer in a state where said aerobic region includes organic matter and simultaneously supplying gas from gas supply means into said cylindrical member to generate a stream from said anaerobic space toward said aerobic region in said cylindrical member, and keeping the state for a predetermined period of time.

7. A water cleaning unit used for constructing the water cleaning system according to claim 1, the water cleaning unit comprising:
a bacteria inhabitable portion, made of a soil material and inhabitable by obligatory anaerobic bacteria; and a cylindrical member that has a first open portion and a second open portion, has a length to extend from a first end to a second end of said bacteria inhabitable portion, wherein said second open portion is positioned apart from said bacteria inhabitable portion by a predetermined distance at the second end of said bacteria inhabitable portion when said first open portion is positioned to face the first end of said bacteria inhabitable portion.

8. The water cleaning unit according to claim 7, further comprising:
a closed space surrounded with closing means that is at least partially formed by said bacteria inhabitable portion; wherein
said cylindrical member has a length to extend from said closed space through said closing means, and said second open portion is positioned apart from said bacteria inhabitable portion by a predetermined distance when said first open portion is positioned to face said closed space.

9. The water cleaning unit according to claim 8, wherein at least a surface, not provided with said cylindrical member projecting therefrom, of said bacteria inhabitable portion is covered with a surrounding member blocking passage of said soil material.

10. The water cleaning unit according to claim 9, wherein said surrounding member has a light shielding property.

11. The water cleaning unit according to claim 10, wherein said bacteria inhabitable portion and said closed space are provided therebetween with a meshed member having water permeability and blocking passage of said soil material.

12. The water cleaning unit according to claim 11, further comprising a particulate carrier inhabitable by aerobic bacteria and facultative anaerobic bacteria to form, when said bacteria inhabitable portion inhabitable by obligatory anaerobic bacteria is defined as a first bacteria inhabitable portion, a second bacteria inhabitable portion that is adjacent to the first bacteria inhabitable portion and is inhabitable by facultative anaerobic bacteria and a third bacteria inhabitable portion that is adjacent to the second bacteria inhabitable portion and is inhabitable by aerobic bacteria.

13. The water cleaning unit according to claim 12, wherein said bacteria inhabitable portion is dry.

14. The water cleaning unit according to claim 13, further comprising a support leg for securing a predetermined gap from an installation surface.

15. A water cleaning method comprising:
installing, in water, a first bacteria inhabitable portion made of a soil material that is inhabitable by obligatory anaerobic bacteria and preliminarily pressed into a shape, forming, in water, a second bacteria inhabitable portion that is adjacent to the first bacteria inhabitable portion, has a particulate carrier, and is inhabitable by facultative anaerobic bacteria, a third bacteria inhabitable portion that is adjacent to the second bacteria inhabitable portion, has a particulate carrier, and is inhabitable by aerobic bacteria, and an anaerobic space that has an anaerobic environment and links with said first bacteria inhabitable portion, locating, at a position linking with said third bacteria inhabitable portion, an aerobic region including organic matter and oxygen, and linking the aerobic region and said anaerobic space, and
forming an obligatory anaerobic layer by multiplying obligatory anaerobic bacteria in said first bacteria inhabitable portion, forming a facultative anaerobic layer by multiplying facultative anaerobic bacteria in said second bacteria inhabitable portion, forming an aerobic layer by multiplying aerobic bacteria in said third bacteria inhabitable portion, causing these bacteria to decompose the organic matter in said aerobic region, and moving the obligatory anaerobic bacteria flowing out of said obligatory anaerobic layer and products therefrom from said anaerobic space to said aerobic region.

* * * * *